United States Patent
Lin et al.

(10) Patent No.: US 11,271,771 B2
(45) Date of Patent: Mar. 8, 2022

(54) CONTROLLER AREA NETWORK BUS BASED SECURITY COMMUNICATIONS METHOD, APPARATUS, AND SYSTEM

(71) Applicant: Huawei Technologies Co., Ltd., Shenzhen (CN)

(72) Inventors: Hsiao-Ying Lin, Singapore (SG); Zhuo Wei, Singapore (SG); Qingdi Sha, Shenzhen (CN); Kang Tang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 16/692,654

(22) Filed: Nov. 22, 2019

(65) Prior Publication Data

US 2020/0092129 A1 Mar. 19, 2020

Related U.S. Application Data

(63) Continuation of application No. PCT/CN2017/116986, filed on Dec. 18, 2017.

(30) Foreign Application Priority Data

May 25, 2017 (CN) .......................... 201710381307.4
Sep. 20, 2017 (CN) .......................... 201710854489.2

(51) Int. Cl.
*H04L 12/40* (2006.01)
*H04L 9/08* (2006.01)

(52) U.S. Cl.
CPC ............ *H04L 12/40* (2013.01); *H04L 9/0819* (2013.01); *H04L 9/0869* (2013.01); *H04L 2012/40215* (2013.01); *H04L 2012/40273* (2013.01)

(58) Field of Classification Search
CPC ..... H04L 12/40; H04L 9/0819; H04L 9/0869; H04L 2012/40215; H04L 2012/40273
See application file for complete search history.

(56) References Cited

U.S. PATENT DOCUMENTS 6,021,450 A * 2/2000 Yoshizawa .......... G06F 13/4273
                                                        710/305
9,231,936 B1    1/2016 Wang et al.
(Continued)

FOREIGN PATENT DOCUMENTS

CN          104025506 A    9/2014
CN          104767618 A    7/2015
(Continued)

OTHER PUBLICATIONS

Woo, S., et al., "A Practical Security Architecture for In-vehicle CAN-FD", IEEE Transactions on Intelligent Transportation Systems, XP011618109, vol. 17, No. 8, Aug. 2016, pp. 2248-2261.
(Continued)

*Primary Examiner* — Henry Tsai
*Assistant Examiner* — John B Roche
(74) *Attorney, Agent, or Firm* — Conley Rose, P.C.

(57) ABSTRACT

A controller area network bus based security communications system includes a gateway electronic control unit (ECU) and at least one control area network (CAN) bus ECU. The gateway ECU generates a random number, and sends the random number to the at least one CAN bus ECU. A first CAN bus ECU obtains the random number sent by the gateway ECU, and generates a first information authentication code based on a key of a first CAN identifier, the random number sent by the gateway ECU, a count value of the first CAN identifier, and data of a first CAN packet.

20 Claims, 13 Drawing Sheets

(56) References Cited

U.S. PATENT DOCUMENTS

| | | | |
|---|---|---|---|
| 9,426,164 B2 | 8/2016 | Otsuka | |
| 9,787,677 B2 | 10/2017 | Jung et al. | |
| 10,419,212 B2 * | 9/2019 | Dai | H04L 63/061 |
| 2011/0093639 A1 | 4/2011 | Richards | |
| 2014/0310530 A1 | 10/2014 | Oguma et al. | |
| 2015/0089236 A1 | 3/2015 | Han et al. | |
| 2016/0026787 A1 | 1/2016 | Nairn et al. | |
| 2016/0099939 A1 | 4/2016 | Jung et al. | |
| 2016/0315766 A1 | 10/2016 | Ujiie et al. | |
| 2016/0330032 A1 | 11/2016 | Naim et al. | |
| 2016/0373261 A1 * | 12/2016 | Tschache | H04L 12/40104 |
| 2017/0134394 A1 | 5/2017 | Xu et al. | |

FOREIGN PATENT DOCUMENTS

| | | |
|---|---|---|
| CN | 105897669 A | 8/2016 |
| CN | 106027260 A | 10/2016 |
| JP | 2013098719 A | 5/2013 |
| WO | 2015048058 A1 | 4/2015 |

OTHER PUBLICATIONS

Machine Translation and Abstract of Chinese Publication No. CN106027260, Oct. 12, 2016, 11 pages.

Machine Translation and Abstract of Chinese Publication No. CN104767618, Jul. 8, 2015, 15 pages.

Xia, Z., et al., "A Secure Design for Practical Identity-Anonymized CAN Application," 2016, 9 pages.

Kurachi, R., et al., "CaCAN—Centralized Authentication System in CAN (Controller Area Network)," 2014, 9 pages.

Herrewege, A., et al., "CANAuth—A Simple, Backward Compatible Broadcast Authentication Protocol for CAN Bus," ECRYPT Workshop on Lightweight Cryptography, 2011, 7 pages.

Harman, "Can Implicit Authentication—The Use of Lightweight Cryptography," Nov. 2016, 19 pages.

"Road vehicles—Interchange of digital information—Controller area network (CAN) for high-speed communication, Amendment 1," ISO 11898-1 International standard, Apr. 1, 1995, 75 pages.

Hazem, A., et al., "LCAP-A Lightweight CAN Authentication Protocol for Securing In-Vehicle Networks," 2012, 10 pages.

Radu, et al.,"LeiA—A Lightweight Authentication Protocol for CAN," European Symposium on Research in Computer Security (ESORICS), 2016, 18 pages.

Groza, B., et al., "LiBrA-CAN: a Lightweight Broadcast Authentication Protocol for Controller Area Networks," 11th International Conference on Cryptology and Network Security, 2012, 16 pages.

Krawczyk, H., et al., "HMAC-based Extract-and-Expand Key Derivation Function (HKDF)," RFC 5869, May 2010, 14 pages.

Ueda, H., et al., "Security Authentication System for In-Vehicle Network," Automotive, SEI Technical Review, 2015 SEI Technical Review, No. 81, Oct. 2015, 5 pages.

Nurnberger, S., et al., "vatiCAN: Vetted, Authenticated CAN Bus," Conference on Cryptographic Hardware and Embedded Systems, 2016, 20 pages.

* cited by examiner

| Byte 7 | 0xAD |
| Byte 6 | 0xDE |
| Byte 5 | 0xEF |
| Byte 4 | 0xBE |
| Byte 3 | 0xAD |
| Byte 2 | 0xDE |
| Byte 1 | 0x1f40 |
| Byte 0 | |
| Identifier | 0x123 |

Engine speed 0x1F40=8000 RPM

Tampered CAN packet

| Byte 7 | 0xAD |
| Byte 6 | 0xDE |
| Byte 5 | 0xEF |
| Byte 4 | 0xBE |
| Byte 3 | 0xAD |
| Byte 2 | 0xDE |
| Byte 1 | 0xDC |
| Byte 0 | 0x05 |
| Identifier | 0x123 |

Engine speed 0x5DC=1500 RPM

Original CAN packet

CONTROLLER AREA NETWORK BUS BASED SECURITY COMMUNICATIONS METHOD, APPARATUS, AND SYSTEM

CROSS-REFERENCE TO RELATED APPLICATIONS

This application is a continuation of International Patent Application No. PCT/CN2017/116986, filed on Dec. 18, 2017, which claims priority to Chinese Patent Application No. 201710854489.2, filed on Sep. 20, 2017, which claims priority to Chinese Patent Application No. 201710381307.4, filed on May 25, 2017. The disclosures of the aforementioned applications are hereby incorporated by reference in their entireties.

TECHNICAL FIELD

This application relates to the field of communications technologies, and in particular, to a controller area network (CAN) bus based security communications method, apparatus, and system, in particular for a vehicle.

BACKGROUND

A CAN communication protocol defines a data transmission standard of a physical layer (PHY) and a data link layer (DLL), is a broadcast-mode transmission channel, and is widely applied, for example, is widely applied to in-vehicle communication.

In a CAN communications network architecture in which communication is performed based on the CAN communication protocol, one central gateway electronic control unit (ECU) is connected to a plurality of ECUs using a CAN bus system. The CAN bus system may include a plurality of CAN buses. A plurality of ECUs in each CAN bus are connected to each other using another CAN bus and the central gateway ECU and separately receive and send a service and information. For example, in a CAN communications network architecture applied to in-vehicle communication shown in FIG. 1, one central gateway ECU is connected to a plurality of CAN buses (a power drive system CAN bus, a comfort system CAN bus, a diagnostic system CAN bus, and an infotainment system CAN bus) that are responsible for an in-vehicle function service. A plurality of ECUs in each CAN bus that is responsible for the in-vehicle function service are connected to each other using another CAN bus and the central gateway ECU and separately receive and send a service and information. For example, a power drive system may detect in real time an engine speed and transmit an engine speed value to the power drive system CAN bus, and the engine speed value may be transmitted to a dash board ECU using the power drive system CAN bus. After receiving the engine speed value, the dash board ECU may display in real time the engine speed value on a dash board.

In a process in which communication is performed based on the CAN communication protocol, a malicious attacker may perform an eavesdropping attack, an injection attack, or a replay attack on a CAN packet (frame) transmitted in the communication process, to perform an effective attack on the CAN bus system. For example, in a CAN communications system applied to in-vehicle communication, the engine speed value is transmitted using an original CAN packet shown in FIG. 2. In the original CAN packet with an identifier of 0x123 in FIG. 2, values of a byte 0 to a byte 7 may be used to represent the engine speed value. For example, an engine speed value represented by the byte 0 and the byte 1 is 0x5DC=1500 RPM. If an attacker obtains the original CAN packet through eavesdropping, obtains a CAN packet format through parsing, and injects an incorrect value for an attack target (the engine speed value). For example, in an embedded tampered CAN packet in FIG. 2, the engine speed value is changed to 0x1F40=8000 RPM. After receiving the embedded tampered CAN packet, the dash board learns through parsing that the engine speed value is 0x1F40=8000 RPM. As a result, the engine speed value received and displayed by the dash board is an incorrect value.

To withstand the eavesdropping attack, the injection attack, or the replay attack performed by the attacker on the CAN packet, there are some mechanisms for authenticating or encrypting the CAN packet. For example, in a mechanism, an encryption operation may be performed on data (a CAN packet identifier, a counter value corresponding to a CAN identifier, and data in a CAN packet corresponding to the CAN packet identifier) in the CAN packet using a key, and an information verification code is generated, then the information verification code is transmitted using an extra CAN packet. However, in this method, the data in the to-be-transmitted CAN packet is still not encrypted. Consequently, in this manner, eavesdropping cannot be withstood, and only the replay attack can be withstood. In addition, transmission overheads are relatively high because the information verification code is transmitted using the extra CAN packet. For another example, in another mechanism, a group of cyclic redundancy check (CRC) values is first calculated according to the data in the CAN packet corresponding to the CAN packet identifier, and then the data and the CRC values are connected in series and encrypted using the key. However, because the CRC values do not have randomness, if the attacker obtains a valid CRC value, the replay attack can be still performed. For still another example, in still another mechanism, an information authentication code is embedded in a relatively high transceiver physical frequency using non-standard CAN transceiver hardware, and is transmitted with a standard CAN packet at the same time, so that a CAN packet information authentication mechanism is implemented and an information authentication code technology is used. Because the non-standard CAN transceiver hardware is used, the CAN transceiver hardware needs to be modified, and cannot be directly applied to an existing CAN bus based communications system.

Therefore, it is imperative to provide an effective method for performing security communication based on a CAN bus, so as to withstand an eavesdropping attack, an injection attack, or a replay attack performed by an attacker.

SUMMARY

Embodiments of this application provide a CAN bus based security communications method, apparatus, and system, to effectively withstand an eavesdropping attack, an injection attack, and a replay attack performed by an attacker.

According to a first aspect, a CAN bus based security communications system is provided, where the CAN bus based security communications system includes a gateway ECU and at least one CAN bus connected to the gateway ECU, each CAN bus is connected to at least one CAN bus ECU, and the at least one CAN bus ECU includes a first CAN bus ECU. The gateway ECU is configured to generate a random number, and send the generated random number to the at least one CAN bus ECU using the at least one CAN bus. The first CAN bus ECU is configured to obtain the random number sent by the gateway ECU, and generate a first information authentication code based on a key of a first CAN identifier, the random number sent by the gateway ECU, a count value of the first CAN identifier, and data of a first CAN packet. The first CAN bus ECU is further configured to perform an encryption operation based on a second CAN packet and the key of the first CAN identifier, to obtain a first encryption operation result, perform an equal-length encryption operation on the first encryption operation result, the first information authentication code, the count value of the first CAN identifier, and the data of the first CAN packet, to obtain the first CAN packet on which encrypted authentication is performed, and send the first CAN packet on which encrypted authentication is performed.

The key of the first CAN identifier is allocated in advance by the CAN bus based security communications system to the first CAN identifier, the count value of the first CAN identifier is determined according to a quantity of CAN packets transmitted by the first CAN bus ECU using the first CAN identifier, and varies with the quantity of the CAN packets transmitted by the first CAN bus ECU using the first CAN identifier, the first CAN packet is a packet to be sent by the first CAN bus ECU, and the first CAN bus ECU sends the first CAN packet using the first CAN identifier.

The second CAN packet is a historical CAN packet of the first CAN bus ECU.

In an embodiment, if the first CAN packet is the first CAN packet sent by the first CAN bus ECU using the first CAN identifier, the historical CAN packet of the first CAN bus ECU may be an initial default CAN packet allocated in advance by the CAN bus based security communications system to the first CAN identifier. If the first CAN packet is a non-first CAN packet sent by the first CAN bus ECU using the first CAN identifier, the historical CAN packet of the first CAN bus ECU may be a specified CAN packet in CAN packets having been sent by the first CAN bus ECU using the first CAN identifier.

In a possible design, the specified CAN packet in the CAN packets having been sent by the first CAN bus ECU using the first CAN identifier is a previous CAN packet that is adjacent to the first CAN packet and that is in the CAN packets having been sent by the first CAN bus ECU using the first CAN identifier, so as to reduce storage overheads.

In the embodiments of this application, in the process in which the first CAN bus ECU performs the encryption operation on the CAN packet and in the process of generating the information authentication code, not only the data of the to-be-sent packet is used, but also the random number, the count value, and the specified CAN packet in the sent CAN packets are used. Therefore, even if a same data value is injected, different information authentication codes and different encryption operation structures are generated. Therefore, the CAN bus ECU sends the CAN packet on which encrypted authentication is performed, to withstand a replay attack. In addition, in combination with a double process of encryption and authentication, data in a data area of the transmitted CAN packet can withstand all of an eavesdropping attack, an injection attack, and a replay attack, and security is relatively high. In addition, the information authentication code may be considered as being directly embedded into the data area of the CAN packet, instead of being carried using another CAN packet, so that transmission overheads are relatively low. In addition, CAN transceiver hardware is not modified in an entire design that can be applied to an existing CAN bus system.

The first CAN bus ECU may obtain a first generation key based on the random number and the key of the first CAN identifier, and generate the first information authentication code based on the first generation key, the random number, the count value of the first CAN identifier, and the data of the first CAN packet, so as to further improve CAN packet transmission security.

The CAN bus based security communications system further includes a second CAN bus ECU. The second CAN bus ECU is configured to obtain a first CAN packet on which encrypted authentication is performed, and decrypt the first CAN packet on which encrypted authentication is performed, to obtain a first decryption information authentication code, decryption data of the first CAN packet, and a first decryption count value of the first CAN identifier. The second CAN bus ECU obtains the random number sent by the gateway ECU, and generates a second information authentication code based on the key of the first CAN identifier, the random number sent by the gateway ECU, the first decryption count value of the first CAN identifier, and the decryption data of the first CAN packet. If the first decryption information authentication code and the second information authentication code are consistent, and the first decryption count value of the first CAN identifier is valid, the first CAN packet on which encrypted authentication is performed is valid.

That the first decryption count value of the first CAN identifier is valid means that the first decryption count value of the first CAN identifier falls within a preset allowable error range of a count value, so as to set different ranges according to different security levels.

The second CAN bus ECU may obtain the first generation key based on the random number sent by the gateway ECU and the key of the first CAN identifier, and generate the second information authentication code based on the first generation key, the random number sent by the gateway ECU, the first decryption count value of the first CAN identifier, and the decryption data of the first CAN packet.

In a possible design, the gateway ECU may perform encrypted authentication on the random number. For example, the gateway ECU may obtain a first random number sending key based on a third CAN packet and a key of a second CAN identifier. The gateway ECU generates a first random number information authentication code based on the first random number sending key and the random number to be sent by the gateway ECU, and performs an encryption operation on the first random number sending key and the third CAN packet, to obtain a second encryption operation result. The gateway ECU performs an equal-length encryption operation on the second encryption operation result, the first random number information authentication code, and the to-be-sent random number, to obtain a random number on which encrypted authentication is performed, and sends the random number on which encrypted authentication is performed to the at least one CAN bus ECU.

The first CAN bus ECU is further configured to obtain the second CAN identifier, the third CAN packet, and the random number on which encrypted authentication is performed, obtain a second random number sending key based on the key of the second CAN identifier and the third CAN packet, and perform an encryption operation on the second random number sending key and the third CAN packet, to obtain a third encryption operation result. The first CAN bus ECU performs an equal-length decryption operation on the third encryption operation result and the random number on which encrypted authentication is performed, to obtain a first random number decryption information authentication code, generates a second random number information authentication code based on the random number sent by the gateway ECU and the second random number sending key, and determines that the random number sent by the gateway ECU is valid, if the first random number decryption information authentication code and the second random number information authentication code are consistent.

The gateway ECU sends a CAN packet to the at least one CAN bus ECU using the second CAN identifier, and the key of the second CAN identifier is allocated in advance by the CAN bus based security communications system to the second CAN identifier.

The third CAN packet is a historical CAN packet of the gateway ECU.

In an embodiment, if the random number to be sent by the gateway ECU is the first random number sent by the gateway ECU, the historical CAN packet of the gateway ECU is an initial default CAN packet allocated in advance by the CAN bus based security communications system to the gateway ECU. If the random number to be sent by the gateway ECU is a non-first random number sent by the gateway ECU, the historical CAN packet of the gateway ECU is a specified CAN packet in CAN packets having been sent by the gateway ECU using the second CAN identifier.

In a possible design, the specified CAN packet in the CAN packets having been sent by the gateway ECU using the second CAN identifier is a previous CAN packet that is adjacent to a CAN packet sent by the gateway ECU using the second CAN identifier and that is in the CAN packets having been sent by the gateway ECU using the second CAN identifier, so as to reduce storage overheads.

In the embodiments of this application, the gateway ECU sends the random number on which encrypted authentication is performed, and the first CAN bus ECU verifies validity of the received random number, so as to further improve security in the CAN bus based security communications system.

According to a second aspect, a CAN bus based security communications apparatus is provided. The CAN bus based security communications apparatus may be applied to a first CAN bus ECU. The CAN bus based security communications apparatus applied to the first CAN bus ECU has a function for implementing the first CAN bus ECU according to the first aspect and any design of the first aspect, and the function may be implemented using hardware or may be implemented by executing corresponding software by hardware. The hardware or the software includes one or more modules corresponding to the function. The module may be software and/or hardware.

In a possible design, the CAN bus based security communications apparatus applied to the first CAN bus ECU includes a receiving unit, a processing unit, and a sending unit, and the receiving unit, the processing unit, and the sending unit may correspond to function steps performed by the first CAN bus ECU. Details are not described herein.

In another possible design, the CAN bus based security communications apparatus applied to the first CAN bus ECU includes a processor, a transceiver, and storage space. The storage space (which may also be referred to as a memory) is coupled with the processor, and is used to store various software programs and/or a plurality of groups of instructions. The processor invokes the stored programs or the instructions in the storage space, to perform the function steps performed by the first CAN bus ECU, and control the transceiver to receive and send a signal.

According to a third aspect, a CAN bus based security communications apparatus is provided. The CAN bus based security communications apparatus may be applied to a second CAN bus ECU. The CAN bus based security communications apparatus applied to the second CAN bus ECU has a function for implementing the second CAN bus ECU according to the first aspect and any design of the first aspect, and the function may be implemented using hardware or may be implemented by executing corresponding software by hardware. The hardware or the software includes one or more modules corresponding to the function. The module may be software and/or hardware.

In a possible design, the CAN bus based security communications apparatus applied to the second CAN bus ECU includes a receiving unit and a processing unit, and the receiving unit and the processing unit may correspond to function steps performed by the second CAN bus ECU. Details are not described herein.

In another possible design, the CAN bus based security communications apparatus applied to the second CAN bus ECU includes a processor, a transceiver, and storage space. The storage space (which may also be referred to as a memory) is coupled with the processor, and is used to store various software programs and/or a plurality of groups of instructions. The processor invokes the stored programs or the instructions in the storage space, to perform the function steps performed by the second CAN bus ECU, and control the transceiver to receive and send a signal.

According to a fourth aspect, a CAN bus based security communications apparatus is provided. The CAN bus based security communications apparatus may be applied to a gateway ECU. The CAN bus based security communications apparatus applied to the gateway ECU has a function for implementing the gateway ECU according to the first aspect and any design of the first aspect, and the function may be implemented using hardware or may be implemented by executing corresponding software by hardware. The hardware or the software includes one or more modules corresponding to the function. The module may be software and/or hardware.

In a possible design, the CAN bus based security communications apparatus applied to the gateway ECU includes a processing unit and a sending unit, and the processing unit and the sending unit may correspond to function steps performed by the gateway ECU. Details are not described herein.

In another possible design, the CAN bus based security communications apparatus applied to the gateway ECU includes a processor, at least one group of transceivers, and storage space. The storage space (which may also be referred to as a memory) is coupled with the processor, and is used to store various software programs and/or a plurality of groups of instructions. The processor invokes the stored programs or the instructions in the storage space, to perform the function steps performed by the gateway ECU, and control the at least one group of transceivers to receive and send a signal.

According to a fifth aspect, a CAN bus based security communication method is provided. In the method, method steps performed by a CAN bus ECU correspond to function steps performed by the first CAN bus ECU according to the first aspect and any design of the first aspect.

According to a sixth aspect, a CAN bus based security communication method is provided. In the method, method steps performed by a CAN bus ECU correspond to function steps performed by the second CAN bus ECU according to the first aspect and any design of the first aspect.

According to a seventh aspect, a CAN bus based security communication method is provided. In the method, method steps performed by a gateway ECU correspond to function steps performed by the gateway ECU according to the first aspect and any design of the first aspect.

According to an eighth aspect, a computer storage medium is provided. The computer storage medium is configured to store some instructions. When the instructions are executed, any function of the gateway ECU, the first CAN bus ECU, and the second CAN bus ECU according to the first aspect and any possible design of the first aspect may be completed.

According to a ninth aspect, a computer program product is provided. The computer program product is configured to store a computer program. The computer program is configured to execute any function of the gateway ECU, the first CAN bus ECU, and the second CAN bus ECU according to the first aspect and any possible design of the first aspect.

According to the CAN bus based security communications method, apparatus, and system provided in the embodiments of this application, in the process in which the first CAN bus ECU performs the encryption operation on the CAN packet and in the process of generating the information authentication code, not only the data of the to-be-sent packet is used, but also the random number, the count value, and the specified CAN packet in the sent CAN packets are used. Therefore, even if a same data value is injected, different information authentication codes and different encryption operation structures are generated. Therefore, the CAN bus ECU sends the CAN packet on which encrypted authentication is performed, to withstand a replay attack. In addition, in combination with a double process of encryption and authentication, data in a data area of the transmitted CAN packet can withstand all of an eavesdropping attack, an injection attack, and a replay attack, and security is relatively high. In addition, the information authentication code may be considered as being directly embedded into the data area of the CAN packet, instead of being carried using another CAN packet, so that transmission overheads are relatively low. In addition, CAN transceiver hardware is not modified in an entire design that can be applied to an existing CAN bus system.

Further, in the embodiments of this application, the first CAN bus ECU and the second CAN bus ECU perform key generation processing on the key of the first CAN identifier using the random number sent by the gateway ECU, so that the key used each time has higher randomness, and CAN packet transmission security can be more effectively improved.

BRIEF DESCRIPTION OF DRAWINGS

FIG. 2 is a schematic diagram in which a CAN packet is eavesdropped and injected in a CAN communications network for in-vehicle communication.

DESCRIPTION OF EMBODIMENTS

The following describes technical solutions of embodiments in this application with reference to accompanying drawings.

Figure 1:
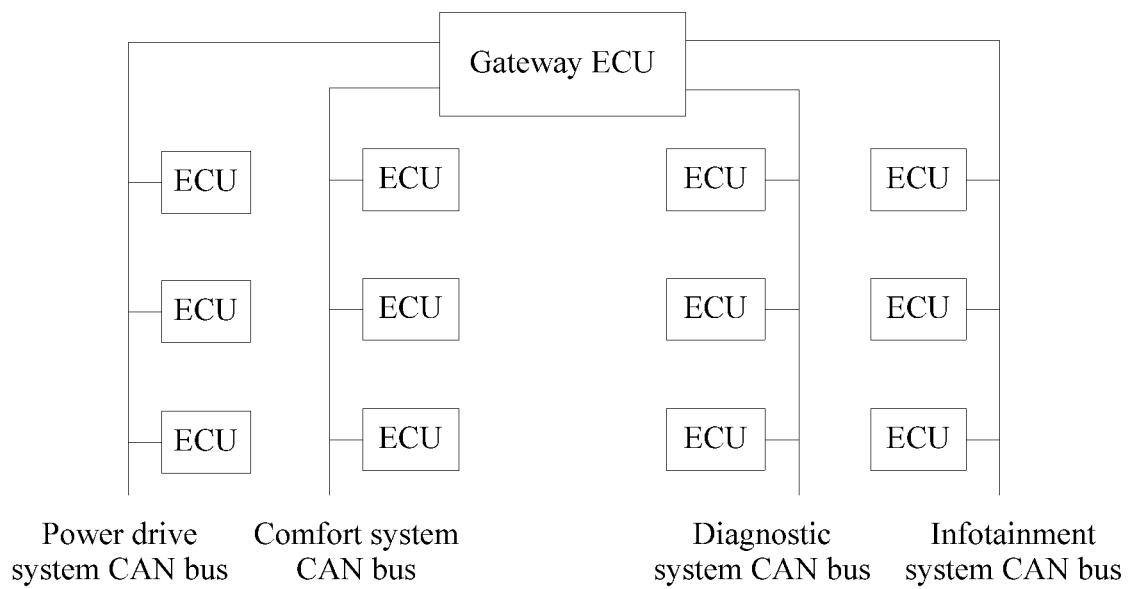
FIG. 1 shows a CAN communications network architecture applied to in-vehicle communication.
Figure 3:
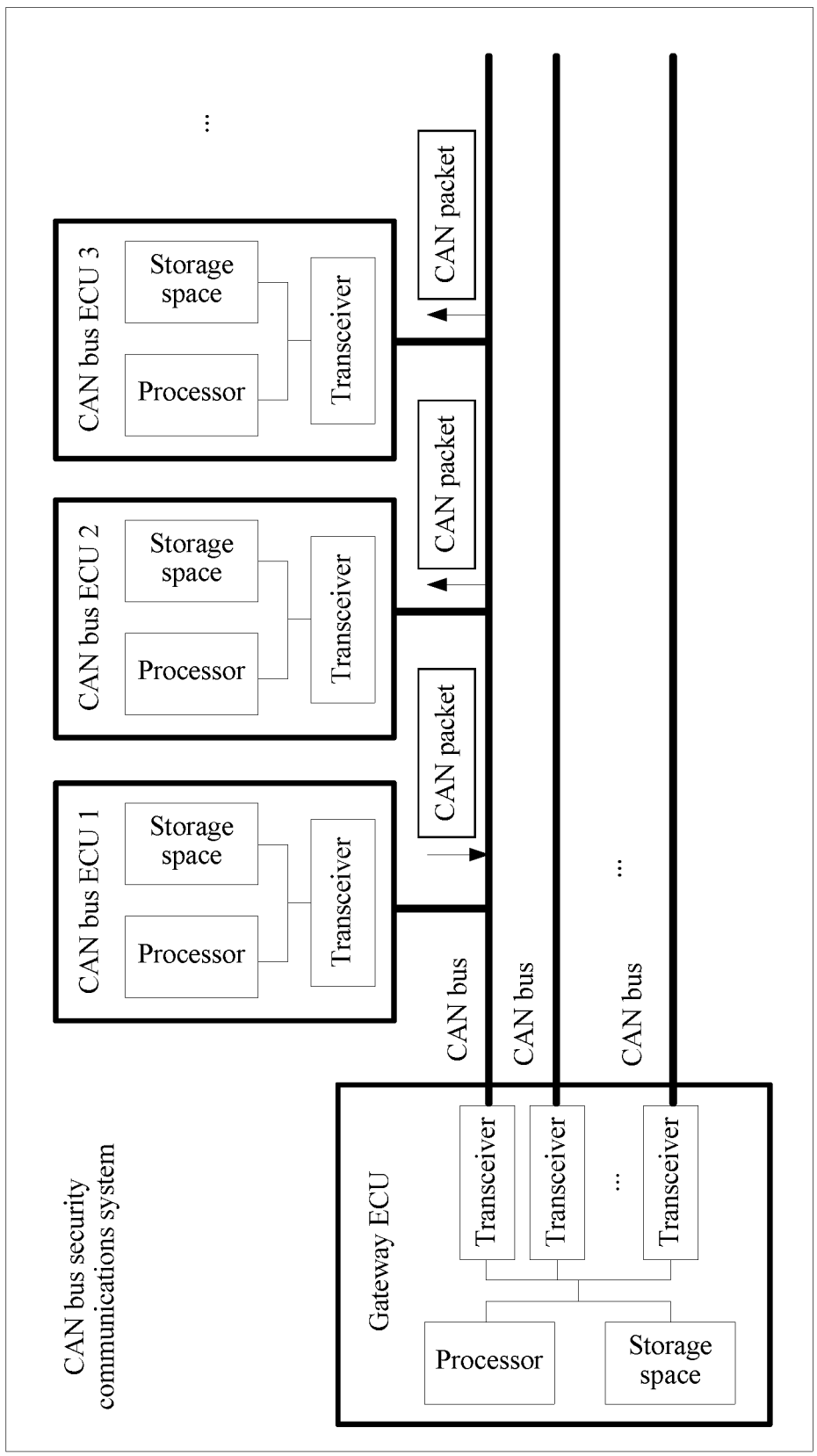
FIG. 3 shows a CAN bus based security communications system according to an embodiment of this application.

FIG. 3 shows a CAN bus based security communications system according to an embodiment of this application. Referring to FIG. 3, the CAN bus based security communications system includes a gateway ECU and at least one CAN bus connected to the gateway ECU. Each CAN bus is connected to at least one CAN bus ECU. Both the gateway ECU and the CAN bus ECU have a processor that performs operation processing, internal storage space used to store a command, and a transceiver that sends and receives information. The CAN bus ECU may usually include a group of transceivers, and is connected to one CAN bus. The gateway ECU may include a plurality of groups of transceivers, and is connected to a plurality of CAN buses. The CAN bus may be understood as a sending channel of the CAN bus based security communications system, and the gateway ECU may perform parallel information sending and receiving using the plurality of CAN buses connected to the gateway ECU. The CAN bus ECU sends and receives information using the CAN bus connected to the CAN bus ECU. Each CAN bus ECU may communicate with the gateway ECU, and the CAN bus ECUs may communicate with each other.

It should be noted that structures of the gateway ECU and the CAN bus ECU in the CAN bus based security communications system shown in FIG. 3 are merely an implementation of this embodiment of this application. In actual application, the gateway ECU and the CAN bus ECU may further include more or fewer components, and this is not limited herein.

The transceiver may be connected to and communicate with another transceiver using an entity CAN bus. The entity CAN bus performs communication using a CAN communication protocol, and the CAN communication protocol may include but is not limited to CAN2.0A, CAN2.0B, or CAN flexible data rate (CAN-FD). The transceiver may also communicate with another communications device using different communications networks, such as the Ethernet, a radio access network (RAN), or a wireless local area network (WLAN). During specific implementation, a communication protocol supported by a communications interface 304 may include but is not limited to $2^{nd}$ generation (2G)/$3^{rd}$ generation (3G), Long Term Evolution (LTE), Wireless Fidelity (Wi-Fi), $5^{th}$ generation 5G new radio (NR), or the like.

The storage space (which may also be referred to as a memory) is coupled with the processor, and is used to store various software programs and/or a plurality of groups of instructions. During specific implementation, the storage space may include a high-speed random access memory, and may also include a nonvolatile memory, such as one or more disk storage devices, a flash memory device, or another nonvolatile solid-state storage device. The storage space may store a CAN bus based security communication operating system. The storage space may be used to store an implementation program of this embodiment of this application. The storage space may further store a network communications program. The network communications program may be used to communicate with one or more auxiliary devices, one or more terminal devices, or one or more network devices.

The processor may be a general-purpose central processing unit (CPU), a microprocessor, an application-specific integrated circuit (ASIC), or one or more integrated circuits that are configured to control program execution of the solutions of this application.

In some embodiments, the gateway ECU and the CAN bus ECU may further include an output device and an input device. The output device communicates with the processor, and may display information in a plurality of manners. For example, the output device may be a liquid crystal display (LCD), a light emitting diode (LED) display device, a cathode ray tube (CRT) display device, a projector, or the like. The input device communicates with the processor, and may receive input of a user in a plurality of manners. For example, the input device may be a mouse, a keyboard, a touchscreen device, or a sensing device. For ease of use of the output device and the input device by a user, in some embodiments, the memory may further store a user interface program. The user interface program may vividly display content of an application program using a graphical operation interface, and receive a control operation of the user on the application program using an input control such as a menu, a dialog box, or a key.

Figure 4:
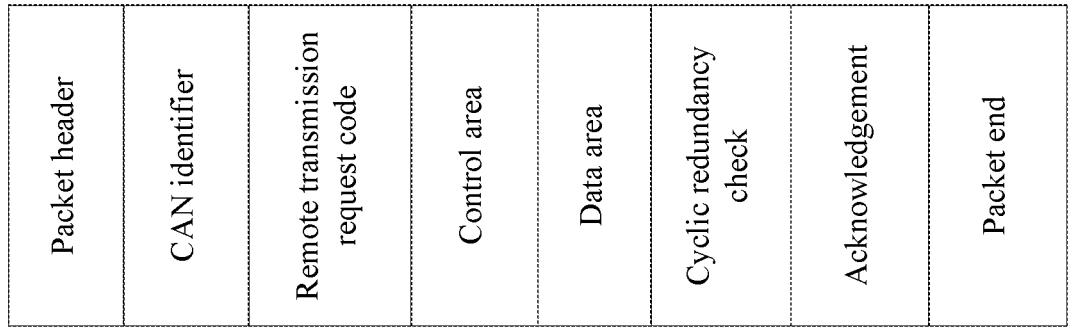
FIG. 4 is a schematic diagram of a format of a CAN packet according to an embodiment of this application.

A format of a CAN packet (frame) transmitted in a communication process between the CAN bus ECUs and between the CAN bus ECU and the gateway ECU is specified in a CAN bus based communication protocol. FIG. 4 is a schematic diagram of a format of a CAN packet. Referring to FIG. 4, the CAN packet includes a packet header (start of frame (SOF)), a CAN identifier, a remote transmission request (RTR) code, a control area (Control), a data area (data), cyclic redundancy check (CRC), an acknowledgement (ACK), and a packet end (end of frame, EOF). The CAN identifier may be used to identify different CAN packets and has two formats, 11 characters and 29 characters. The data area is of a maximum of 8 bytes in the CAN standard. In a communication process performed using the CAN bus based communication protocol, a transmitter sends a CAN packet, and a receiver selects a to-be-received CAN packet based on the CAN identifier. The CAN packet corresponding to the CAN identifier may have at least two receivers. For example, in FIG. 3, a CAN packet sent by a CAN bus ECU 1 may be received by a CAN bus ECU 2 and a CAN bus ECU 3.

In this embodiment of this application, the CAN packet transmitted between the CAN bus ECUs and between the CAN bus ECU and the gateway ECU may be encrypted and authenticated, so as to withstand an eavesdropping attack, an injection attack, or a replay attack performed by a malicious attacker on the CAN packet.

In this embodiment of this application, a counter may be preconfigured for each ECU (each CAN bus ECU and the gateway ECU) in the CAN bus based security communications system. A count value may be stored for a CAN packet of each CAN identifier using a count value of the counter. The count value of each CAN identifier may represent a quantity of packets that have been transferred in the CAN packet of the CAN identifier in the system, or may be understood that the count value of the CAN identifier may identify a currently transmitted CAN packet. The count value of the CAN identifier is determined according to a quantity of CAN packets transmitted by the CAN bus ECU using the CAN identifier, and varies with the quantity of CAN packets transmitted by the CAN bus ECU using the CAN identifier. In a possible implementation, the count value of the CAN identifier may be implemented using a count value of a rolling counter (rolling counter). Assuming that the quantity of CAN packets transmitted by the CAN bus ECU using the CAN identifier is N, and the count value of the rolling counter is n bits in length, the count value of the CAN identifier may be a value obtained after a modulo operation performed on $N/(2^n)$.

Figure 5:
FIG. 5 is a schematic configuration diagram of a CAN identifier and a count value in a CAN bus based security communications system according to an embodiment of this application.

For example, in FIG. 5, both an ECU that sends a CAN packet and an ECU that receives the CAN packet store a count value of each CAN identifier. A table that stores the count value includes two columns. The first column is a CAN identifier, and the second column is a count value corresponding to the CAN identifier. For example, in FIG. 5, in the ECU that sends the CAN packet, a count value of a CAN identifier $Id_a$ is $C_a$, a count value of a CAN identifier $Id_b$ is $C_b$, and a count value of a CAN identifier $Id_c$ is $C_c$. In the ECU that receives the CAN packet, a count value of a CAN identifier $Id_d$ is $C_d$, a count value of a CAN identifier $Id_e$ is $C_e$, and a count value of a CAN identifier $Id_f$ is $C_f$.

Figure 6:
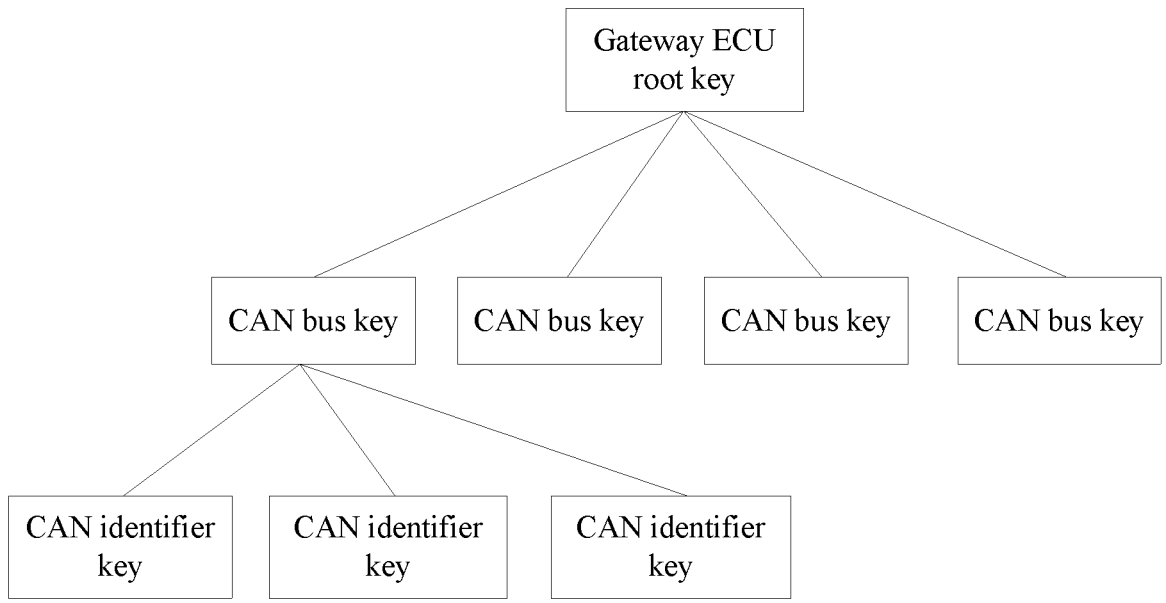
FIG. 6 is a schematic diagram of configuring a key corresponding to a CAN identifier in a CAN bus based security communications system according to an embodiment of this application.
Figure 7:
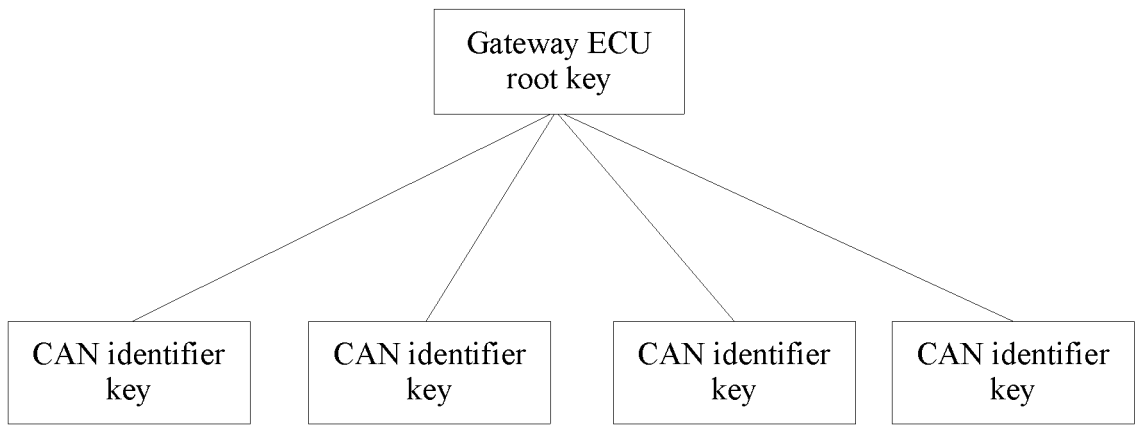
FIG. 7 is another schematic diagram of configuring a key corresponding to a CAN identifier in a CAN bus based security communications system according to an embodiment of this application.

Further, in this embodiment of this application, a corresponding key may be configured for each CAN identifier in the CAN bus based security communications system, so as to perform encryption and authentication using the key. In this embodiment of this application, keys may be generated and configured for different CAN identifiers using a hierarchical architecture. For example, as shown in FIG. 6, an independently generated root key may be first configured for the entire CAN bus based security communications system, CAN bus keys are generated for different CAN buses using the root key, and then keys of the CAN identifier are generated for the different CAN identifiers using the CAN bus key. In an embodiment, when the key is configured, a root key may be configured for the gateway ECU, and a corresponding CAN bus key may be separately configured for each CAN bus ECU. For example, a key of an ECU on a CAN bus 1 is a CAN bus 1 key, and the CAN bus 1 may generate, using the CAN bus 1 key, a key corresponding to an actually required CAN identifier. In this embodiment of this application, as shown in FIG. 7, an independently generated root key may be further preconfigured for the entire CAN bus based security communications system, and then different keys are generated for different CAN identifiers using the root key. In an embodiment, when the key is configured, a root key may be configured for each ECU, and the ECU may generate, using the root key, a key corresponding to an actually required CAN identifier. According to the key configuration method in which the key is generated and configured using the hierarchical architecture, a space requirement of each ECU for storing the key can be reduced. In this embodiment of this application, a key and a system initial value may be independently generated and configured for different CAN identifiers.

In this embodiment of this application, the CAN bus ECU in the CAN bus based security communications system may generate an information authentication code based on the key of the CAN identifier, the count value of the identifier, a random number, data in a data area of a to-be-sent CAN packet, perform an encryption operation based on the key of the CAN identifier and a specified CAN packet in CAN packets having been sent using the CAN identifier, and perform an equal-length encryption operation on an encryption operation result, the information authentication code, the count value of the CAN identifier, and the data in the data area of the to-be-sent CAN packet, so that a data length of a data area of a CAN packet on which encrypted authentication is performed complies with a data area length specified in the CAN bus based communication protocol, and the data of the CAN packet on which encrypted authentication is performed is placed into the data area of the to-be-sent packet for sending. In the encryption operation process of the CAN packet on which encrypted authentication is performed and the process of generating the information authentication code, not only the data of the to-be-sent packet is used, but also the random number, the count value, and the specified CAN packet in the sent CAN packets are used. Therefore, even if a same data value is injected, different information authentication codes and different encryption operation structures are generated. Therefore, the CAN bus ECU sends the CAN packet on which encrypted authentication is performed, to withstand a replay attack. In addition, in combination with a double process of encryption and authentication, the data in the data area of the transmitted CAN packet can withstand all of an eavesdropping attack, an injection attack, and a replay attack, and security is relatively high. In addition, the information authentication code may be considered as being directly embedded into the data area of the CAN packet, instead of being carried using another CAN packet, so that transmission overheads are relatively low. In addition, CAN transceiver hardware is not modified in an entire design that can be applied to an existing CAN bus system.

In a possible example, if the to-be-sent CAN packet is the first packet of the CAN identifier, the CAN bus ECU may perform the encryption operation based on the key of the CAN identifier and an initial default CAN packet. The initial default CAN packet may be preconfigured in an initial setting phase of a parameter in the CAN bus based security communications system.

For ease of description, in this embodiment of this application, the CAN packet to be sent by the CAN bus ECU may be referred to as a first CAN packet, and the CAN identifier used by the CAN bus ECU to send the first CAN packet is referred to as a first CAN identifier. The CAN packet used by the CAN bus ECU to perform the encryption operation process is referred to as a second CAN packet. The second CAN packet is a historical CAN packet of the first CAN bus ECU. The historical CAN packet may be understood as a packet that already exists before a current CAN packet is sent.

In an embodiment, if the first CAN packet is the first CAN packet sent by the first CAN bus ECU using the first CAN identifier, the historical CAN packet of the first CAN bus ECU may be an initial default CAN packet allocated in advance by the CAN bus based security communications system to the first CAN identifier. If the first CAN packet is a non-first CAN packet sent by the first CAN bus ECU using the first CAN identifier, the historical CAN packet of the first CAN bus ECU may be a specified CAN packet in CAN packets having been sent by the first CAN bus ECU using the first CAN identifier.

In the CAN bus based security communications system, the CAN bus ECU that receives the CAN packet on which encrypted authentication is performed may decrypt the received CAN packet on which encrypted authentication is performed to obtain decryption data of the CAN packet, a decryption count value of the CAN identifier, and a decryption information authentication code, and generate an information authentication code based on the key of the CAN identifier, the random number, the decryption count value of the CAN identifier, and the decryption data of the CAN packet. If it is determined that the information authentication code obtained through decryption and the generated information authentication code are consistent, and the decryption count value of the CAN identifier is valid, the decryption data of the CAN packet is valid.

That the decryption count value of the identifier is valid may mean that the decryption count value of the CAN identifier is the same as a preset count value. The preset count value may be a count value of a CAN identifier used in a process of obtaining the CAN packet on which encrypted authentication is performed.

In a possible example, that the decryption count value of the CAN identifier is valid may mean that the decryption count value of the CAN identifier falls within a preset allowable error range of a count value. The allowable error range may be preconfigured in the initial setting phase of the parameter in the CAN bus based security communications system. The error range may be set to different ranges according to different security levels. An error range with a relatively high requirement for a security level is less than an error range with a relatively low requirement for a security level.

For ease of description, in this embodiment of this application, a CAN bus ECU that sends a CAN packet in the CAN bus based security communications system is referred to as a first CAN bus ECU, and a CAN bus ECU that receives the CAN packet in the CAN bus based security communications system is referred to as a second CAN bus ECU.

In a possible example, the first CAN bus ECU and the second CAN bus ECU may generate a first generation key based on the random number and the key of the CAN identifier, and generate an information authentication code based on the first generation key, the random number, the count value of the CAN identifier, and the data of the CAN packet, so as to further improve system security and withstand a replay attack.

In another possible example, in this embodiment of this application, the random number used by the first CAN bus ECU and the second CAN bus ECU to perform the encrypted authentication process may be generated and sent by the gateway ECU. The gateway ECU may send the random number in a broadcast manner or the like.

The gateway ECU may also perform encrypted authentication on the random number using an encrypted authentication process similar to the foregoing CAN packet encrypted authentication process, to obtain the random number on which encrypted authentication is performed. For example, the gateway ECU obtains a random number sending key based on the key of the CAN identifier and the specified CAN packet in the sent CAN packets. The gateway ECU generates a random number information authentication code based on the random number sending key and a to-be-sent random number, and performs an encryption operation on the random number sending key and the specified CAN packet in the sent CAN packets, to obtain an encryption operation result. The gateway ECU performs an equal-length encryption operation on the encryption operation result, the random number information authentication code, and the to-be-sent random number, to obtain a random number on which encrypted authentication is performed. The gateway ECU may send the random number on which encrypted authentication is performed to the CAN bus ECU in the CAN bus based security communications system. The gateway ECU may send the random number on which encrypted authentication is performed in a broadcast manner or the like.

If the random number sent by the gateway ECU is the first random number, the gateway ECU may obtain the random number sending key based on the initial default CAN packet and the key of the CAN identifier.

For ease of description, in this embodiment of this application, the CAN identifier used by the gateway ECU to send the CAN packet may be referred to as a second CAN identifier, and the CAN bus based security communications system may preconfigure a key for the second CAN identifier. The CAN packet used by the gateway ECU in the process of generating the random number sending key is referred to as a third CAN packet. The third CAN packet may be a historical CAN packet of the gateway ECU. In an embodiment, if the random number to be sent by the gateway ECU is the first random number sent by the gateway ECU, the historical CAN packet of the gateway ECU is an initial default CAN packet allocated in advance by the CAN bus based security communications system to the gateway ECU. If the random number to be sent by the gateway ECU is a non-first random number sent by the gateway ECU, the historical CAN packet of the gateway ECU is a specified CAN packet in CAN packets having been sent by the gateway ECU using the second CAN identifier.

The CAN bus ECU that receives the random number on which encrypted authentication is performed may verify validity of the received random number. For example, the CAN bus ECU that receives the random number on which encrypted authentication is performed may obtain the random number sending key based on the key of the second CAN identifier of the gateway ECU and the third CAN packet. For ease of description, in this embodiment of this application, a random number sending key obtained by the gateway ECU based on the third CAN packet and the key of the second CAN identifier may be referred to as a first random number sending key, and a random number sending key obtained by the CAN bus ECU based on the key of the second CAN identifier and the third CAN packet is referred to a second random number sending key. The CAN bus ECU that receives the random number on which encrypted authentication is performed performs an encryption operation on the second random number sending key and the third CAN packet, to obtain an encryption operation result, and performs an equal-length decryption operation on the obtained encryption operation result and the random number on which encrypted authentication is performed, to obtain an information authentication code obtained after the random number is decrypted. For ease of description, the encryption operation result obtained after the CAN bus ECU performs the encryption operation on the second random number sending key and the third CAN packet is referred to as a third encryption operation result. The information authentication code obtained after decryption of the random number obtained when the CAN bus ECU performs the equal-length decryption operation on the third encryption operation result and the random number on which encrypted authentication is performed is referred to as a first random number decryption information authentication code. The CAN bus ECU that receives the random number on which encrypted authentication is performed may generate a random number information authentication code based on the random number sent by the gateway ECU and the second random number sending key. The random number information authentication code is referred to as a second random number information authentication code below. The CAN bus ECU that receives the random number on which encrypted authentication is performed determines whether the first random number decryption information authentication code and the second random number information authentication code are consistent, to verify validity of the random number sent by the gateway ECU. If the first random number decryption information authentication code and the second random number information authentication code are consistent, the random number sent by the gateway ECU is valid, and the CAN packet may be authenticated and encrypted using the sent random number, so as to further improve security.

In this embodiment of this application, the CAN packet transmitted between the CAN bus ECUs and between the CAN bus ECU and the gateway ECU may be encrypted and authenticated, so as to withstand an eavesdropping attack, an injection attack, or a replay attack performed by a malicious attacker on the CAN packet.

A process in which the CAN bus based security communications system performs security communication is described below with reference to actual application.

In this embodiment of this application, to implement the security communication method in the foregoing implementation, the CAN bus based security communications system needs to preconfigure a parameter. For example, a key and a system initial default value corresponding to the CAN identifier need to be preconfigured for each CAN identifier. The system initial default value may be understood as a group of character strings, for example, may be understood as the initial default CAN packet in the foregoing embodiment. In this application, a second CAN identifier needs to be preconfigured for the gateway ECU. The second CAN identifier may be understood as a CAN identifier used when the gateway ECU sends the CAN packet on each CAN bus. A corresponding key and system initial default value (initial default CAN packet) also need to be preconfigured for the second CAN identifier.

In this embodiment of this application, a key of the second CAN identifier and the initial default CAN packet of the gateway ECU need to be configured for the gateway ECU and all CAN bus ECUs that exchange information with the gateway ECU, so that the CAN bus ECU can verify validity of the random number. In this embodiment of this application, the key of the CAN identifier and the initial default CAN packet of the CAN bus ECU need to be configured for the CAN bus ECU that sends and receives a CAN packet of a CAN identifier, so that the CAN bus ECU that sends the CAN packet performs encrypted authentication on the sent CAN packet, and the CAN bus ECU that receives the CAN packet on which encrypted authentication is performed verifies validity of the CAN packet. Further, in this embodiment of this application, the count value of the CAN identifier needs to be configured for each ECU, and an error range of the count value may be further configured, to verify validity of the decryption count value.

Figure 8:
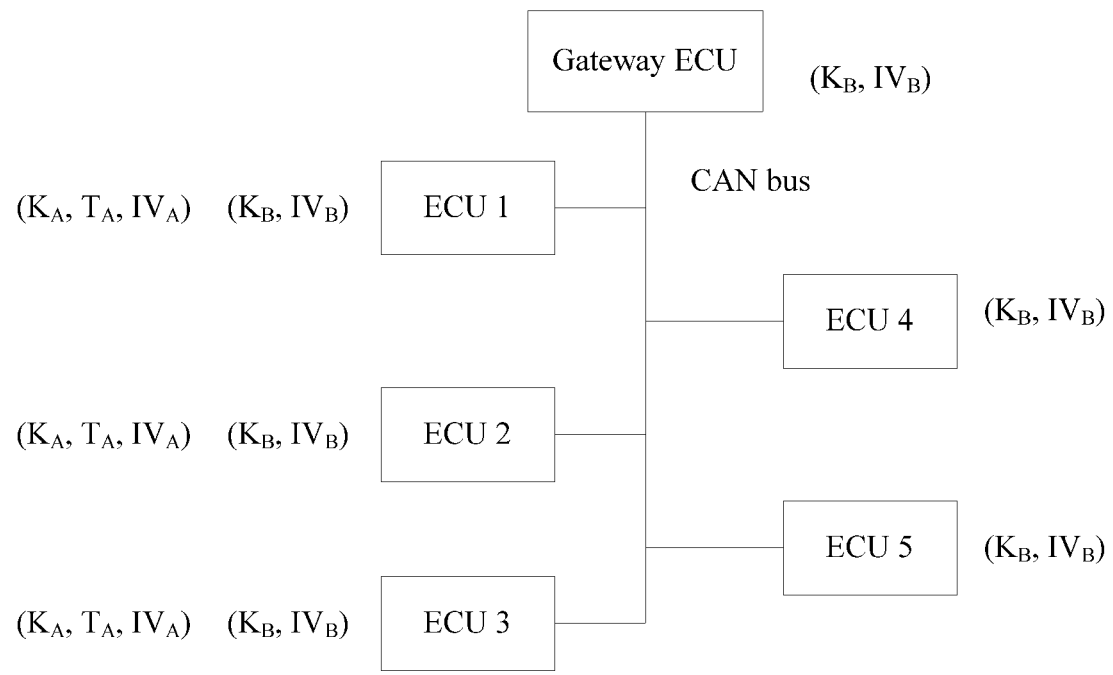
FIG. 8 is a schematic diagram of a preconfigured parameter in a CAN bus based security communications system according to an embodiment of this application.

FIG. 8 is a schematic diagram of a preconfigured parameter in a CAN bus based security communications system according to an embodiment of this application. For example, in FIG. 8, the CAN bus based security communications system includes a gateway ECU and five CAN bus ECUs, an ECU 1, an ECU 2, an ECU 3, an ECU 4, and an ECU 5. It is assumed that a second CAN identifier $CID_B$, a key $K_B$, and an initial default packet $IV_B$ are configured for the gateway ECU in the CAN bus based security communications system. The key $K_B$ and the initial default packet $IV_B$ corresponding to the second CAN identifier $CID_B$ need to be configured both in the gateway ECU and the five CAN bus ECUs. The ECU 1, the ECU 2, and the ECU 3 receive and send a CAN packet of a CAN identifier $CID_A$. It is assumed that a key preconfigured for the CAN identifier $CID_A$ is $K_A$ and an initial default packet is $IV_A$. The ECU 1, the ECU 2, and the ECU 3 need to configure a key corresponding to the CAN identifier $CID_A$ as $K_A$ and configure an initial default packet as $IV_A$. Further, the ECU 1, the ECU 2, and the ECU 3 also need to configure a count value $T_A$ corresponding to the CAN identifier $CID_A$.

In this embodiment of this application, after the CAN bus based security communications system completes the foregoing preconfiguration, the foregoing security communication method may be performed.

Figure 9:
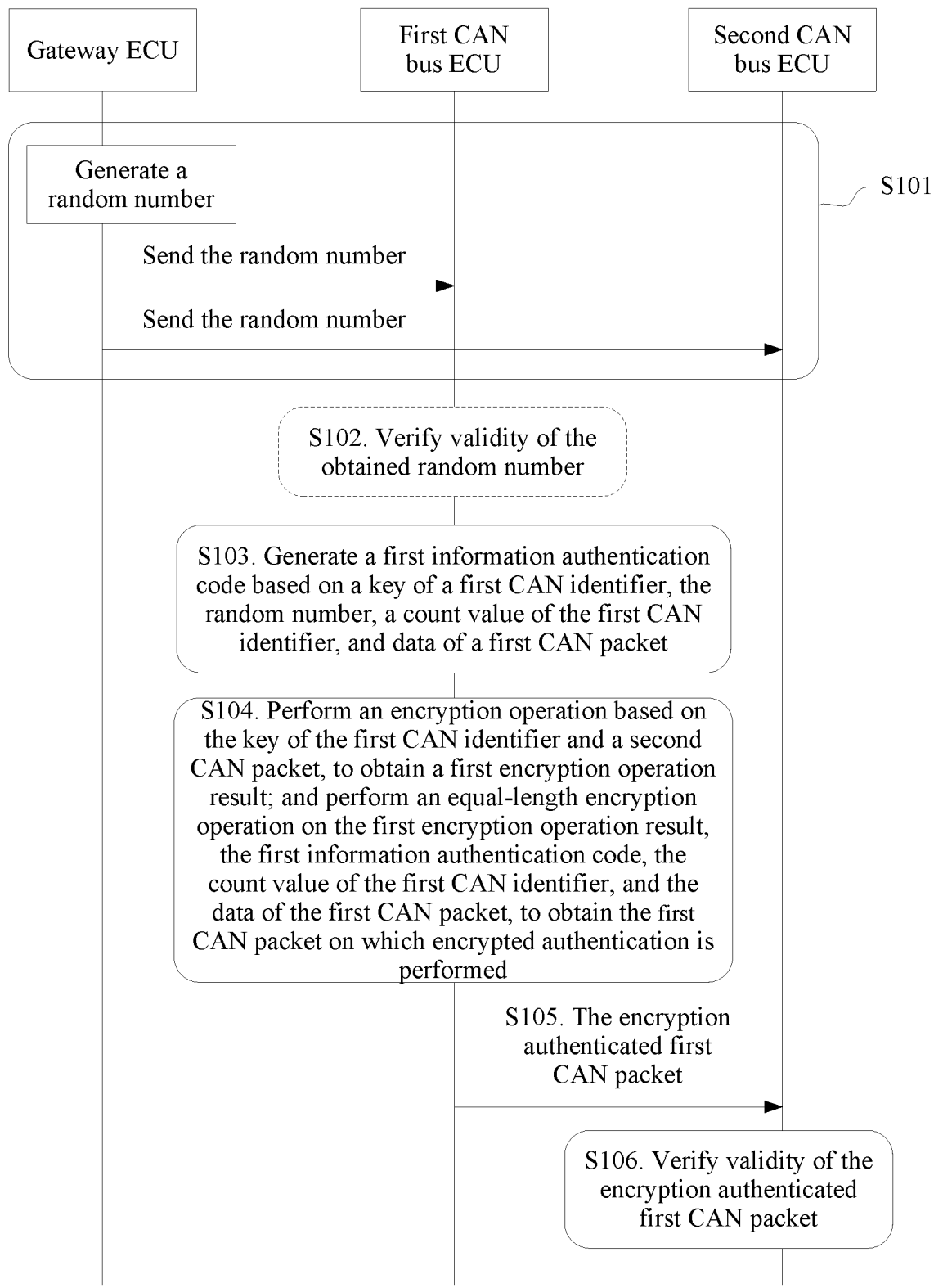
FIG. 9 is a flowchart of implementing a CAN bus based security communication method according to this application.

FIG. 9 is a flowchart of implementing a CAN bus based security communication method according to this application. Referring to FIG. 9, the method includes the following steps.

S101. A gateway ECU generates and sends a random number.

In this embodiment of this application, the gateway ECU may generate a random number R according to a specific frequency, and periodically send the random number to each CAN bus ECU in a CAN bus based security communications system using a CAN bus. The gateway ECU may send the random number to each CAN bus ECU in the CAN bus based security communications system in a periodic broadcast manner.

Figure 10:
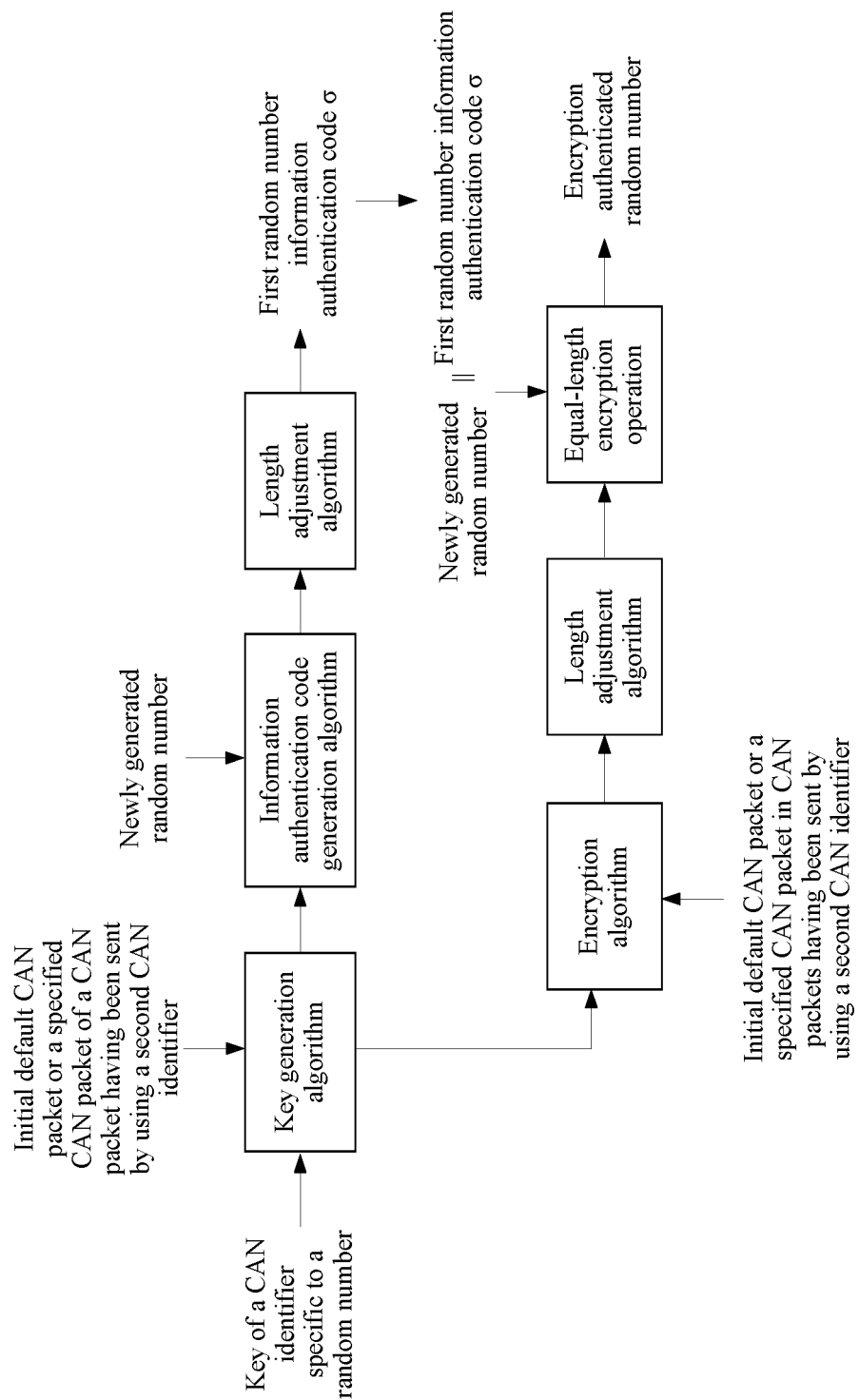
FIG. 10 is a schematic diagram of generating a data area of a random number on which encrypted authentication is performed according to an embodiment of this application.

In a possible implementation, after generating the random number, the gateway ECU may send the random number on which encrypted authentication is performed in a form of a CAN packet. In this embodiment of this application, a data area of the random number on which encrypted authentication is performed may be generated using a method procedure shown in FIG. 10. In FIG. 10, the gateway ECU generates a first random number sending key based on a key $K_B$ corresponding to a second CAN identifier $CID_B$ and a third CAN packet and using a key generation algorithm. The gateway ECU generates a first random number information authentication code σ based on the first random number sending key and a sent random number (a newly generated random number $R_{i+1}$) and using an algorithm of generating an information authentication code and a length adjustment algorithm. The gateway ECU performs an encryption operation based on the first random number sending key and the third CAN packet and using an encryption algorithm such as a block encryption algorithm, to obtain a second encryption operation result. The gateway ECU performs an equal-length encryption operation on the second encryption operation result, the first random number information authentication code, and the sent random number, to obtain the random number on which encrypted authentication is performed. For example, an exclusive OR operation is performed on the second encryption operation result, the first random number information authentication code, and the sent random number, to obtain an operation result with a length of 8 bytes that is the data area of the random number on which encrypted authentication is performed, and the data area of the random number on which encrypted authentication is performed is placed into a data area of the CAN packet for transmission.

In this embodiment of this application, if the sent random number (the newly generated random number $R_{i+1}$) is the first random number ($R_1$), the third CAN packet is an initial default CAN packet of the gateway ECU. If the sent random number (the newly generated random number $R_{i+1}$) is a non-first random number, the third CAN packet is a specified CAN packet in CAN packets having been sent by the gateway ECU using the second CAN identifier.

In this embodiment of this application, the specified CAN packet in the CAN packets having been sent by the gateway ECU using the second CAN identifier may be a previous CAN packet that is adjacent to a CAN packet currently sent using the second CAN identifier or may be a second previous CAN packet, or may be any sent CAN packet. This is not limited in this embodiment of this application, provided that third CAN packets used by the gateway ECU and the CAN bus ECU are consistent.

In this embodiment of this application, to reduce storage overheads, in a possible implementation, the specified CAN packet in the CAN packets having been sent by the gateway ECU using the second CAN identifier may be set to the previous CAN packet that is adjacent to the CAN packet currently sent using the second CAN identifier.

S102. A first CAN bus ECU obtains the random number sent by the gateway ECU, and verifies validity of the obtained random number.

In this embodiment of this application, the step of verifying validity of the random number is an optional step. If the gateway ECU performs encrypted authentication on the sent random number and sends the random number on which encrypted authentication is performed to the CAN bus ECU, an implementation process of verifying the validity of the random number in step S102 may be included.

In this embodiment of this application, the first CAN bus ECU may be understood as an ECU that sends the CAN packet. It may be understood that in this embodiment of this application, the CAN bus ECU that obtains the random number sent by the gateway ECU is not only limited to the first CAN bus ECU, a second ECU also receives the random number sent by the gateway ECU. For ease of description, in this embodiment of this application, the implementation process in which the first CAN bus ECU verifies the validity of the random number is described. An implementation process in which a second CAN bus ECU verifies the validity of the random number is the same as the implementation process in which the first CAN bus ECU verifies the validity of the random number, and details are not described herein again.

Figure 11:
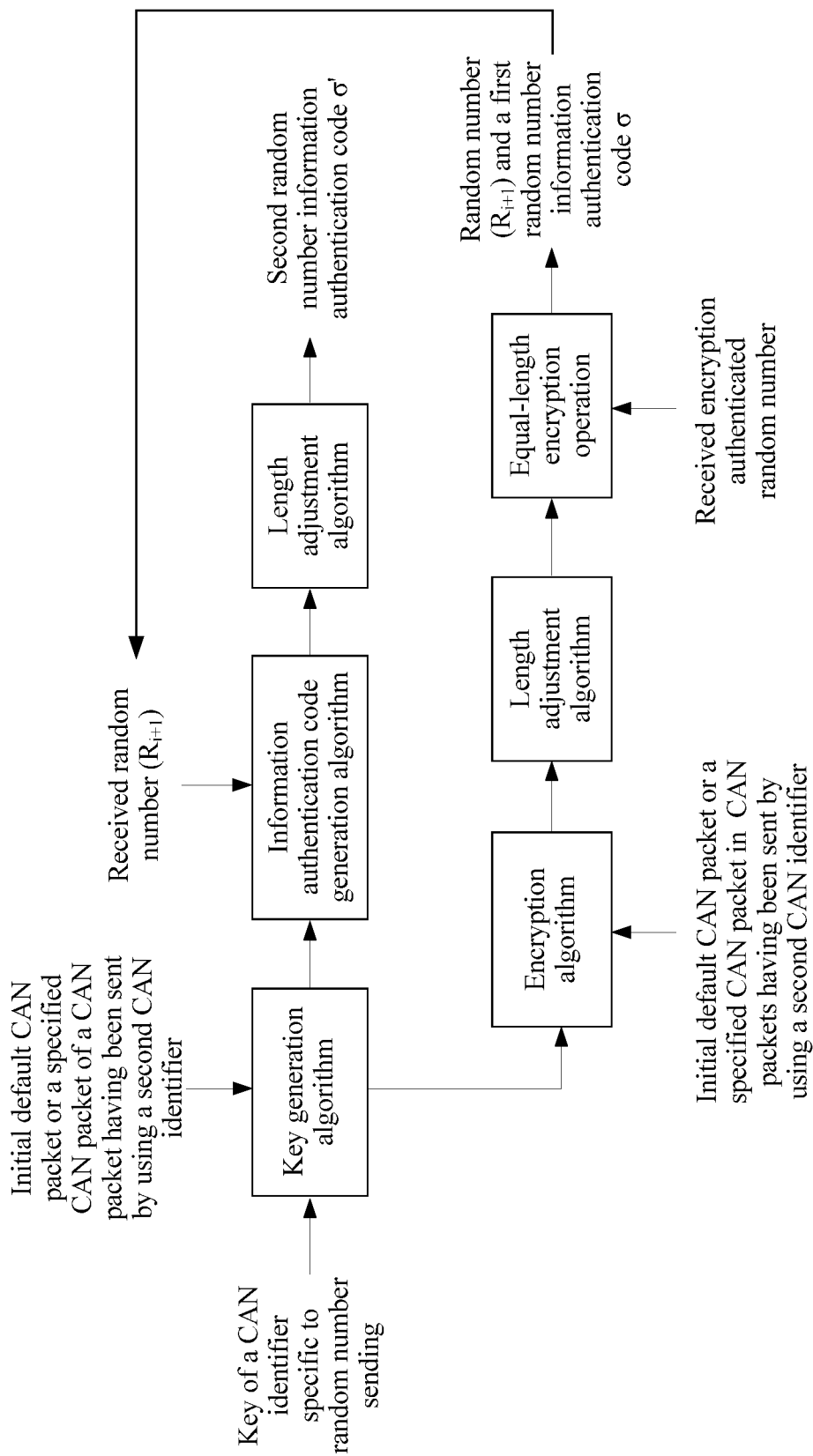
FIG. 11 is a schematic diagram of an implementation process of verifying validity of a random number on which encrypted authentication is performed according to an embodiment of this application.

FIG. 11 is a schematic diagram of the implementation process in which the first CAN bus ECU verifies the validity of the random number on which encrypted authentication is performed according to an embodiment of this application. Referring to FIG. 11, the first CAN bus ECU obtains a second random number sending key based on the key $K_B$ of the second CAN identifier $CID_B$ and the third CAN packet. The third CAN packet may be understood as a specified CAN packet in CAN packets sent using the $CID_B$. If the CAN packet sent using the $CID_B$ does not exist, the third CAN packet is an initial default packet $IV_B$. The first CAN bus ECU performs an encryption operation based on the second random number sending key and the third CAN packet and using a block encryption algorithm or the like, to obtain a third number encryption operation result. The first CAN bus ECU generates a second random number information authentication code σ' based on the random number sent by the gateway ECU and the second random number sending key, and performs an equal-length decryption operation (such as an exclusive OR operation) on the third encryption operation result and the random number on which encrypted authentication is performed, to obtain the random number ($R_{i+1}$) sent by the gateway ECU and the first random number information authentication code σ. The first CAN bus ECU determines whether the first random number information authentication code σ and the second random number information authentication code σ' are consistent. If the first random number information authentication code σ and the second random number information authentication code σ' are consistent, the random number sent by the gateway ECU is valid.

In this embodiment of this application, after verifying that the random number is valid, the first CAN bus ECU may record the valid random number for subsequent use in a process of performing encrypted authentication on the CAN packet.

S103. The first CAN bus ECU generates a first information authentication code based on a key of a first CAN identifier, the random number sent by the gateway ECU, a count value of the first CAN identifier, and data of a first CAN packet.

In this embodiment of this application, the first CAN bus ECU may be understood as an ECU that sends the CAN packet, the first CAN packet may be understood as a CAN packet to be sent by the first CAN bus ECU, and the first CAN identifier may be understood as a CAN identifier used by the first CAN bus ECU to send the first CAN packet.

S104. The first CAN bus ECU performs an encryption operation based on the key of the first CAN identifier and a second CAN packet, to obtain a first encryption operation result, and performs an equal-length encryption operation on the first encryption operation result, the first information authentication code, the count value of the first CAN identifier, and the data of the first CAN packet, to obtain the first CAN packet on which encrypted authentication is performed.

Figure 12:
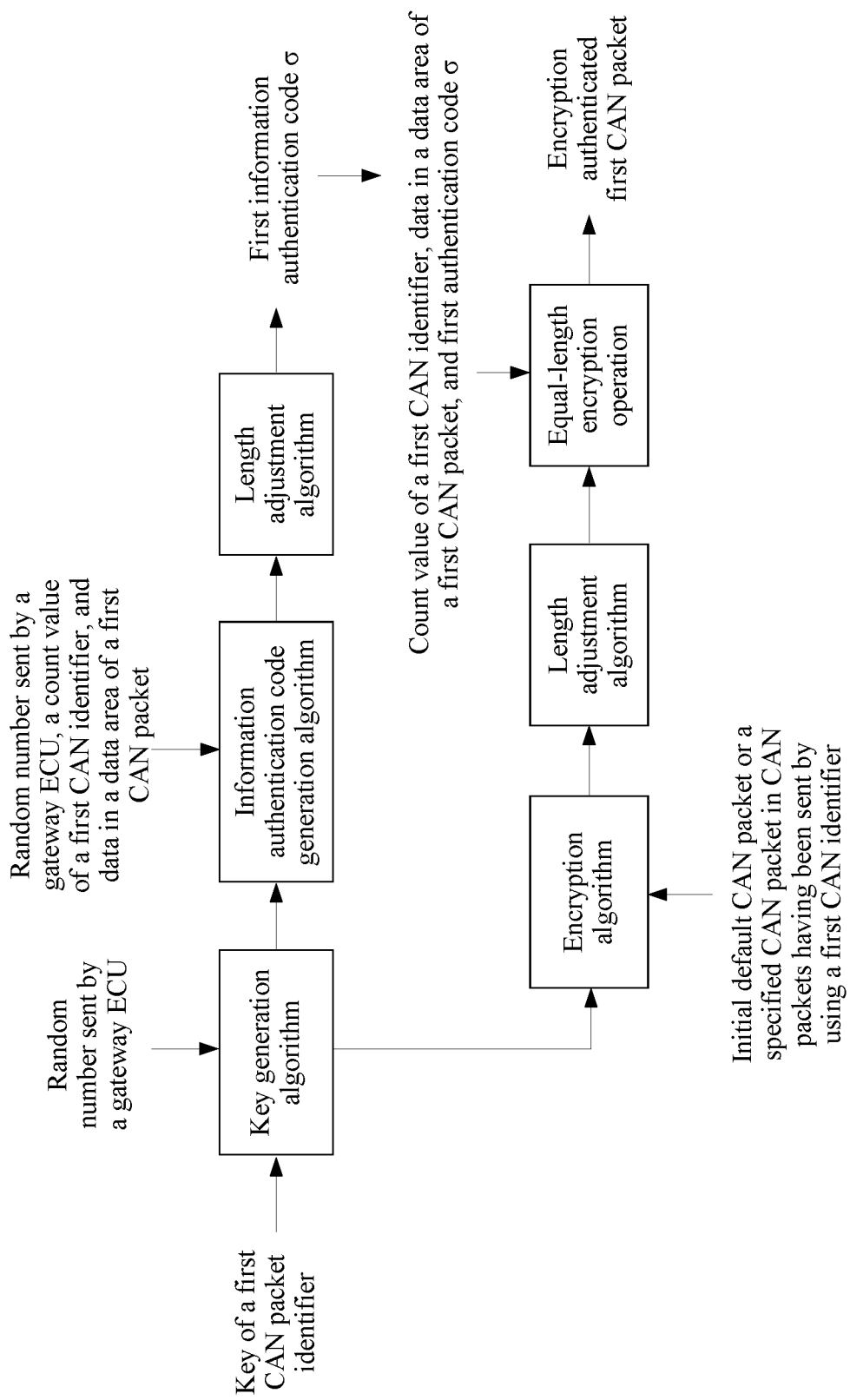
FIG. 12 is a schematic diagram of generating a data area of a CAN packet on which encrypted authentication is performed according to an embodiment of this application.

FIG. 12 is a schematic diagram of an implementation process in which the first CAN bus ECU generates the first CAN packet on which encrypted authentication is performed according to an embodiment of this application. In FIG. 12, the first CAN bus ECU generates a first generation key based on the random number sent by the gateway ECU and a key $K_A$ of a first CAN identifier $CID_A$ and using a key generation algorithm. The first CAN bus ECU generates an information authentication code based on the first generation key, the random number sent by the gateway ECU, the count value $T_A$ of the first CAN identifier, and data in a data area of the first CAN packet, and generates the first information authentication code σ using a length adjustment algorithm. The first CAN bus ECU performs an encryption operation based on the first generation key and the second CAN packet and using a block encryption algorithm or the like, to obtain the first encryption operation result, performs an equal-length encryption operation (such as an exclusive OR operation) on the first encryption operation result, the first information authentication code σ, the count value $T_A$ of the first CAN identifier, and the data in the data area of the first CAN packet, to obtain an operation result with a length of 8 bytes that is the data area of the first CAN packet on which encrypted authentication is performed, and places the data area of the first CAN packet on which encrypted authentication is performed into the data area of the CAN packet for sending.

In this embodiment of this application, if the first CAN packet is the first CAN packet sent using the first CAN identifier $CID_A$, the second CAN packet is an initial default CAN packet $IV_A$ of the first CAN bus ECU. If the first CAN packet is a non-first CAN packet sent using the first CAN identifier $CID_A$, the second CAN packet is a specified CAN packet in CAN packets having been sent using the first CAN identifier $CID_A$.

In this embodiment of this application, the specified CAN packet in the CAN packets having been sent using the first CAN identifier $CID_A$ may be a previous CAN packet that is adjacent to the first CAN packet of the sent CAN packet or may be an adjacent second previous CAN packet, or may be any sent CAN packet. This is not limited in this embodiment of this application, provided that second CAN packets used by the gateway ECU and the CAN bus ECU are consistent.

In this embodiment of this application, to reduce storage overheads, in a possible implementation, the specified CAN packet in the sent CAN packets corresponding to the first CAN identifier may be configured as the previous CAN packet that is adjacent to the first CAN packet of the sent CAN packet.

S105. The first CAN bus ECU sends the first CAN packet on which encrypted authentication is performed, and a second CAN bus ECU receives the first CAN packet on which encrypted authentication is performed.

S106. The second CAN bus ECU verifies validity of the received first CAN packet on which encrypted authentication is performed.

Figure 13:
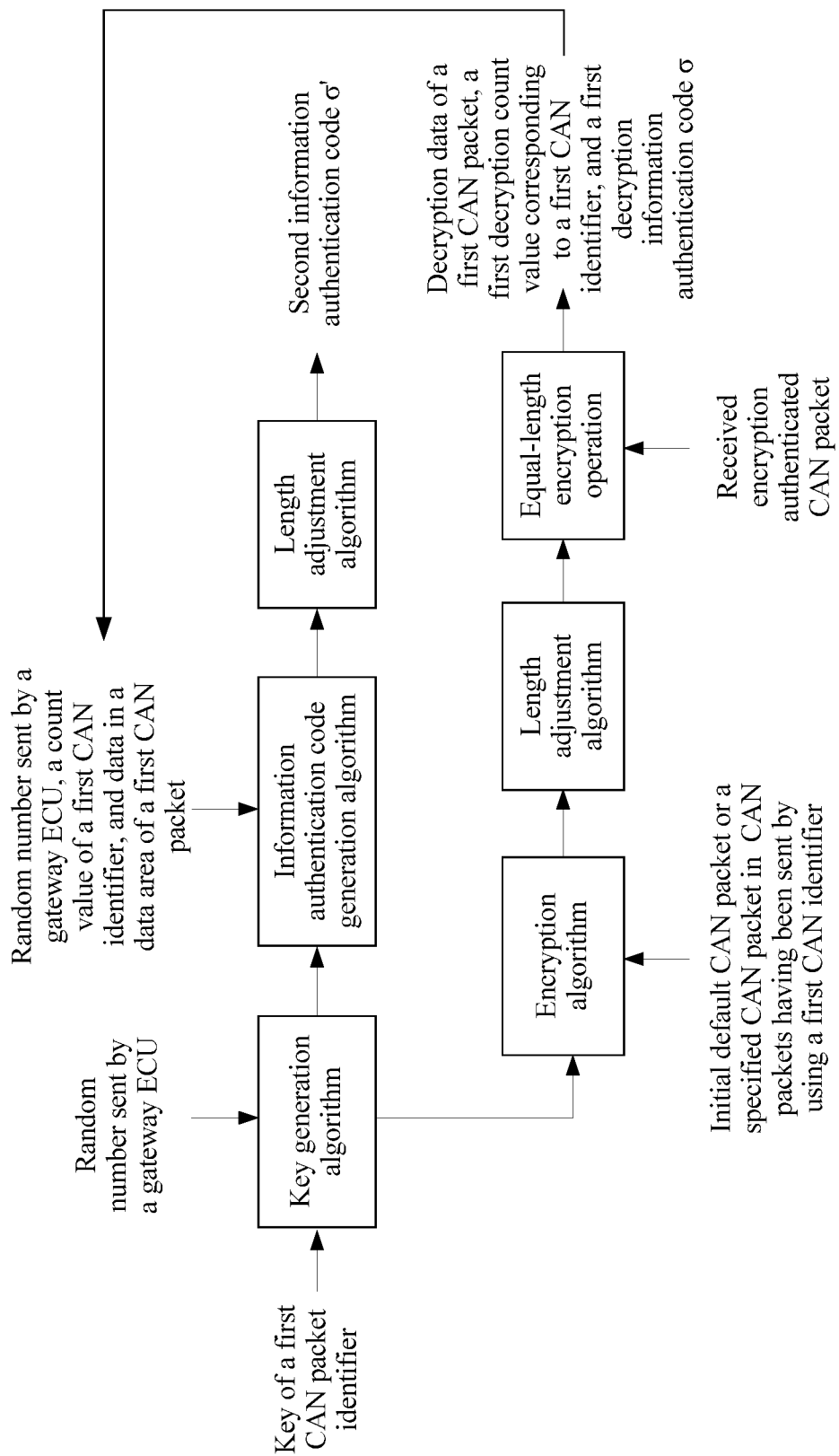
FIG. 13 is a schematic diagram of an implementation process of verifying validity of a CAN packet on which encrypted authentication is performed according to an embodiment of this application.

FIG. 13 is a schematic diagram of an implementation process in which the second CAN bus ECU verifies the validity of the first CAN packet on which encrypted authentication is performed according to an embodiment of this application. In FIG. 13, the second CAN bus ECU decrypts the first CAN packet on which encrypted authentication is performed, to obtain a first decryption information authentication code σ, decryption data of the first CAN packet, and a first decryption count value of the first CAN identifier. The CAN bus ECU obtains the random number (a random number used by a first gateway ECU) sent by the gateway ECU, generates a second information authentication code σ' based on the key $K_A$ of the first CAN identifier $CID_A$, the random number, the first decryption count value of the first CAN identifier, and the decryption data of the first CAN packet, and determines whether the first decryption information authentication code σ and the second information authentication code σ' are consistent and whether the first decryption count value of the first CAN identifier is valid. If the CAN bus ECU determines that the first decryption information authentication code and the second information authentication code are consistent, and the first decryption count value of the first CAN identifier is valid, the first CAN packet on which encrypted authentication is performed is valid. Namely, the received first CAN packet on which encrypted authentication is performed is valid.

In this embodiment of this application, that the first decryption count value of the first CAN identifier is valid means that the first decryption count value of the first CAN identifier falls within a preset allowable error range of a count value. For example, the preconfigured allowable error range of the count value fluctuates up and down by three values. If the first decryption count value is the count value $T_A$ of the first CAN identifier or falls within a range of $T_A \pm 3$, it may be determined that the first decryption count value is valid.

In this embodiment of this application, after the second CAN bus ECU determines that the first CAN packet on which encrypted authentication is performed is valid, subsequent processing may be performed. If it is determined that the first CAN packet on which encrypted authentication is performed is invalid, the CAN packet may be discarded.

According to the CAN bus based security communication method provided in this embodiment of this application, in the process in which the first CAN bus ECU performs the encryption operation on the CAN packet and in the process of generating the information authentication code, not only the data of the to-be-sent packet is used, but also the random number, the count value, and the specified CAN packet in the sent CAN packets are used. Therefore, even if a same data value is injected, different information authentication codes and different encryption operation structures are generated. Therefore, the CAN bus ECU sends the CAN packet on which encrypted authentication is performed, to withstand a replay attack. In addition, in combination with a double process of encryption and authentication, the data in the data area of the transmitted CAN packet can withstand all of an eavesdropping attack, an injection attack, and a replay attack, and security is relatively high. In addition, the information authentication code may be considered as being directly embedded into the data area of the CAN packet, instead of being carried using another CAN packet, so that transmission overheads are relatively low. In addition, CAN transceiver hardware is not modified in an entire design that can be applied to an existing CAN bus system.

Further, in this embodiment of this application, the first CAN bus ECU and the second CAN bus ECU perform key generation processing on the key of the first CAN identifier using the random number sent by the gateway ECU, so that the key used each time has higher randomness, and CAN packet transmission security can be more effectively improved.

The solutions provided in the embodiments of this application are described above from a perspective of interaction among the gateway ECU, the first CAN bus ECU, and the second CAN bus ECU. It may be understood that to implement the foregoing functions, the gateway ECU, the first CAN bus ECU, and the second CAN bus ECU include corresponding hardware structures and/or software modules for executing the functions. With reference to units and algorithm steps of each example described in the embodiments disclosed in this application, the embodiments of this application may be implemented in a form of hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, the gateway ECU, the first CAN bus ECU, and the second CAN bus ECU may be divided into functional units according to the foregoing method examples. For example, each functional unit may be obtained through division according to a corresponding function, or two or more functions may be integrated into one processing unit. The integrated unit may be implemented in a form of hardware, or may be implemented in a form of a software functional unit. It should be noted that the unit division in the embodiments of this application is an example, and is merely logical function division and may be another division manner in an actual implementation.

Figure 14:
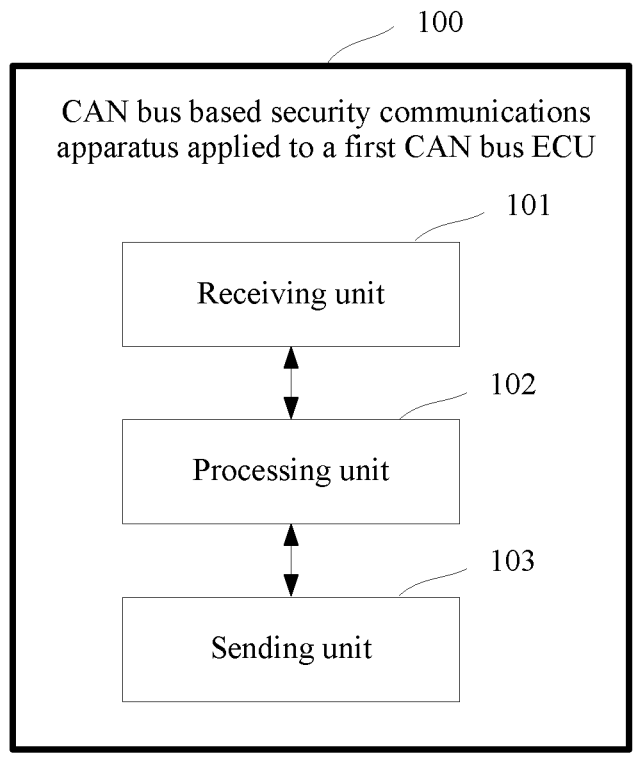
FIG. 14 is a schematic structural diagram of a CAN bus based security communications apparatus according to an embodiment of this application.

When a form of a software functional unit is used for implementation, FIG. 14 is a schematic structural diagram of a CAN bus based security communications apparatus 100 applied to a first CAN bus ECU. Referring to FIG. 14, the CAN bus based security communications apparatus 100 applied to the first CAN bus ECU includes a receiving unit 101, a processing unit 102, and a sending unit 103. The receiving unit 101 is configured to obtain a random number sent by a gateway ECU. The processing unit 102 is configured to generate a first information authentication code based on a key of a first CAN identifier, a count value of the first CAN identifier, data of a first CAN packet, and the random number obtained by the receiving unit 101, where the first CAN identifier is a CAN identifier of the first CAN packet, perform an encryption operation on a second CAN packet based on the key of the first CAN identifier, to obtain a first encryption operation result, and perform an equal-length encryption operation on the first encryption operation result, the first information authentication code, the count value of the first CAN identifier, and the data of the first CAN packet, to obtain the first CAN packet on which encrypted authentication is performed. The sending unit 103 is configured to send the first CAN packet on which encrypted authentication is performed and that is generated by the processing unit 102.

The key of the first CAN identifier is allocated in advance by a CAN bus based security communications system to the first CAN identifier, the count value of the first CAN identifier is determined according to a quantity of CAN packets transmitted by the first CAN bus ECU using the first CAN identifier, and varies with the quantity of the CAN packets transmitted by the first CAN bus ECU using the first CAN identifier. The first CAN packet is a packet to be sent by the first CAN bus ECU. The first CAN bus ECU sends the first CAN packet using the first CAN identifier.

The second CAN packet is a historical CAN packet of the first CAN bus ECU.

In an embodiment, if the first CAN packet is the first CAN packet sent by the first CAN bus ECU using the first CAN identifier, the historical CAN packet of the first CAN bus ECU may be an initial default CAN packet allocated in advance by the CAN bus based security communications system to the first CAN identifier. If the first CAN packet is a non-first CAN packet sent by the first CAN bus ECU using the first CAN identifier, the historical CAN packet of the first CAN bus ECU may be a specified CAN packet in CAN packets having been sent by the first CAN bus ECU using the first CAN identifier.

In a possible implementation, the receiving unit 101 is further configured to obtain a third CAN packet, a second CAN identifier, and a random number on which encrypted authentication is performed sent by the gateway ECU. The processing unit 102 is further configured to obtain a second random number sending key based on a key of the second CAN identifier and the third CAN packet that are received by the receiving unit 101, perform an encryption operation on the second random number sending key and the third CAN packet, to obtain a third encryption operation result, perform an equal-length decryption operation on the third encryption operation result and the random number on which encrypted authentication is performed and that is obtained by the receiving unit, to obtain a first random number decryption information authentication code, generate a second random number information authentication code based on the random number sent by the gateway ECU and the second random number sending key, and determine that the random number that is sent by the gateway ECU and that is obtained by the receiving unit 101 is valid, if the first random number decryption information authentication code and the second random number information authentication code are consistent.

The gateway ECU sends the CAN packet to at least one CAN bus ECU using the second CAN identifier, and the key of the second CAN identifier is allocated in advance by the CAN bus based security communications system to the second CAN identifier. The third CAN packet is a historical CAN packet of the gateway ECU.

In an embodiment, if the random number to be sent by the gateway ECU is the first random number sent by the gateway ECU, the historical CAN packet of the gateway ECU is an initial default CAN packet allocated in advance by the CAN bus based security communications system to the gateway ECU. If the random number to be sent by the gateway ECU is a non-first random number sent by the gateway ECU, the historical CAN packet of the gateway ECU is a specified CAN packet in CAN packets having been sent by the gateway ECU using the second CAN identifier.

In a possible example, the processing unit 102 may obtain a first generation key based on the random number and the key of the first CAN identifier, and generate the first information authentication code based on the count value of the first CAN identifier, the data of the first CAN packet, the first generation key, and the random number.

In another possible example, the specified CAN packet in the CAN packets having been sent using the first CAN identifier is a previous CAN packet that is adjacent to the first CAN packet of the sent CAN packet.

When a form of hardware is used for implementation, the processing unit 102 may be a processor, and the receiving unit 101 and the sending unit 103 may be a transceiver. When the processing unit 102 is a processor, and the receiving unit 101, and the sending unit 103 are a transceiver, the CAN bus based security communications apparatus 100 applied to the first CAN bus ECU may use the structure of the CAN bus ECU in the CAN bus based security communications system shown in FIG. 3. The CAN bus based security communications apparatus 100 that uses the structure of the CAN bus ECU shown in FIG. 3 may be the first CAN bus ECU.

Figure 15:
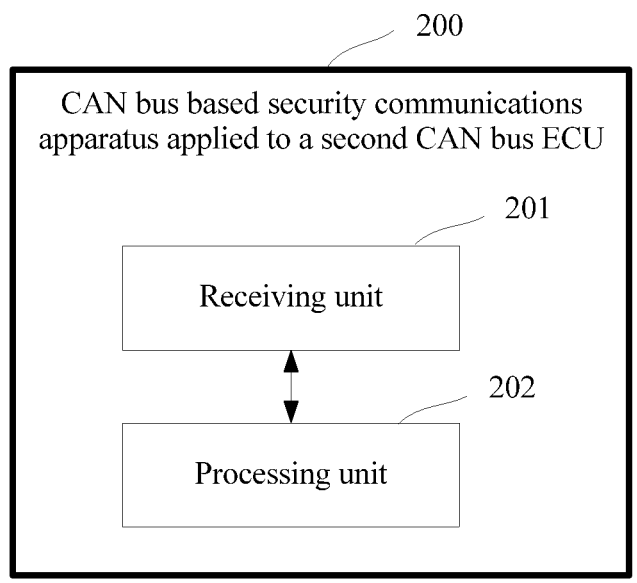
FIG. 15 is a schematic structural diagram of another CAN bus based security communications apparatus according to an embodiment of this application.

When a form of a software functional unit is used for implementation, FIG. 15 is a schematic structural diagram of a CAN bus based security communications apparatus 200 applied to a second CAN bus ECU. Referring to FIG. 15, the CAN bus based security communications apparatus 200 applied to the second CAN bus ECU includes a receiving unit 201 and a processing unit 202. The receiving unit 201 is configured to obtain a first CAN packet on which encrypted authentication is performed and a random number sent by a gateway ECU. The processing unit 202 is configured to decrypt the first CAN packet on which encrypted authentication is performed and that is obtained by the receiving unit 201, to obtain a first decryption information authentication code, decryption data of the first CAN packet, and a first decryption count value of a first CAN identifier, generate a second information authentication code based on the decryption data of the first CAN packet, the first decryption count value of the first CAN identifier, a key of the first CAN identifier, and the random number received by the receiving unit, determine whether the first decryption information authentication code and the second information authentication code are consistent, and determine that the first CAN packet on which encrypted authentication is performed is valid, if the first decryption information authentication code and the second information authentication code are consistent, and the first decryption count value of the first CAN identifier is valid.

That the first decryption count value of the first CAN identifier is valid means that the first decryption count value of the first CAN identifier falls within a preset allowable error range of a count value.

In a possible example, the processing unit 202 uses the following manner to generate the second information authentication code based on the key of the first CAN identifier, the random number, the first decryption count value of the first CAN identifier, and the decryption data of the first CAN packet obtaining a first generation key based on the random number sent by the gateway ECU and the key of the first CAN identifier, and generating the second information authentication code based on the first generation key, the random number sent by the gateway ECU, the first decryption count value of the first CAN identifier, and the decryption data of the first CAN packet.

When a form of hardware is used for implementation, the processing unit 202 may be a processor, and the receiving unit 201 may be a transceiver. When the processing unit 202 is a processor, and the receiving unit 201 is a transceiver, the CAN bus based security communications apparatus 200 applied to the second CAN bus ECU may use the structure of the CAN bus ECU in the CAN bus based security communications system shown in FIG. 3. The CAN bus based security communications apparatus 200 that uses the structure of the CAN bus ECU shown in FIG. 3 may be the second CAN bus ECU.

Figure 16:
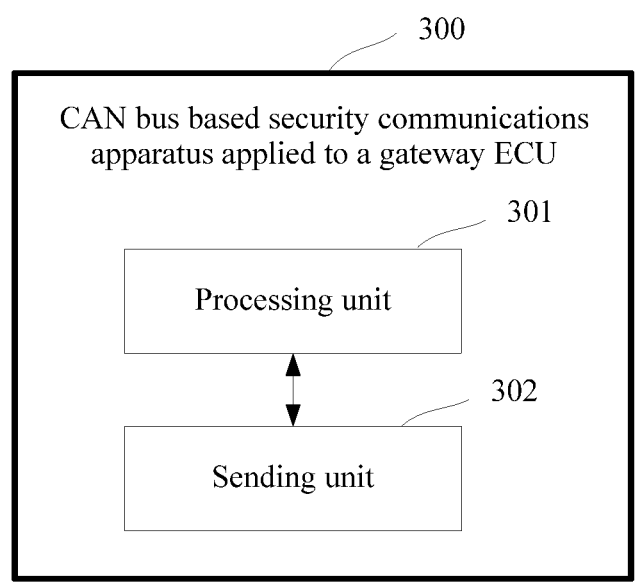
FIG. 16 is a schematic structural diagram of still another CAN bus based security communications apparatus according to an embodiment of this application.

When a form of a software functional unit is used for implementation, FIG. 16 is a schematic structural diagram of a CAN bus based security communications apparatus 300 applied to a gateway ECU. Referring to FIG. 16, the CAN bus based security communications apparatus 300 applied to the gateway ECU includes a processing unit 301 and a sending unit 302. The processing unit 301 is configured to generate a random number. The sending unit 302 is configured to send the random number generated by the processing unit 301 to at least one CAN bus ECU.

The processing unit 301 may obtain a first random number sending key based on a key of a second CAN identifier and a third CAN packet, generate a first random number information authentication code based on the first random number sending key and a random number to be sent by the gateway ECU, perform an encryption operation on the first random number sending key and the third CAN packet, to obtain a second encryption operation result, and perform an equal-length encryption operation on the second encryption operation result, the first random number information authentication code, and the to-be-sent random number, to obtain a random number on which encrypted authentication is performed. The sending unit 302 sends the random number on which encrypted authentication is performed and that is generated by the processing unit 301 to the at least one CAN bus ECU.

The gateway ECU sends a CAN packet to the at least one CAN bus ECU using the second CAN identifier, and the key of the second CAN identifier is allocated in advance by a CAN bus based security communications system to the second CAN identifier. The third CAN packet is a historical CAN packet of the gateway ECU.

In an embodiment, if the random number to be sent by the gateway ECU is the first random number sent by the gateway ECU, the historical CAN packet of the gateway ECU is an initial default CAN packet allocated in advance by the CAN bus based security communications system to the gateway ECU. If the random number to be sent by the gateway ECU is a non-first random number sent by the gateway ECU, the historical CAN packet of the gateway ECU is a specified CAN packet in CAN packets having been sent by the gateway ECU using the second CAN identifier.

In a possible implementation, the specified CAN packet in the CAN packets having been sent using the second CAN identifier is a previous CAN packet that is of the sent CAN packet and that is adjacent to a CAN packet currently sent using the second CAN identifier.

When a form of hardware is used for implementation, the processing unit 301 may be a processor, and the sending unit 302 may be a transceiver. When the processing unit 301 is a processor, and the sending unit 302 is a transceiver, the CAN bus based security communications apparatus 300 applied to the gateway ECU may use the structure of the gateway ECU in the CAN bus based security communications system shown in FIG. 3. The CAN bus based security communications apparatus 300 that uses the structure of the gateway ECU in the CAN bus based security communications system shown in FIG. 3 may be the gateway ECU.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A controller area network (CAN) bus based security communications system, comprising:
   a CAN bus connected to the connected to CAN bus electronic controller ECU; and
   a gateway ECU coupled to the CAN bus and configured to:
     generate a random number, and
     send the random number to the CAN bus ECU using the CAN bus,
   wherein the CAN bus ECU is configured to:
     obtain the random number from the gateway ECU;
     allocate a key to a first CAN identifier;
     determine a count value of the first CAN identifier according to a quantity of CAN packets transmitted by the CAN bus by using the first CAN identifier;
     generate a first information authentication code based on the key of the first CAN identifier, the count value of the first CAN identifier, data of a first CAN packet, and the random number, wherein the first CAN packet is a packet to be sent by the first CAN bus ECU;
     transmit the first CAN packet using the first CAN identifier;
     perform an encryption operation based on a second CAN packet and the key of the first CAN identifier to obtain a first encryption operation result;
     perform an equal-length encryption operation on the first encryption operation result, the first information authentication code, the count value of the first CAN identifier, and the data of the first CAN packet to obtain the first CAN packet on which encrypted authentication is performed; and
     transmit the first CAN packet on which encrypted authentication is performed, wherein the second CAN packet is a historical CAN packet of the CAN bus ECU.

2. The CAN bus based security communications system according to claim 1, wherein the gateway ECU is further configured to:
   obtain a first random number sending key based on a third CAN packet and a key of a second CAN identifier;
   transmit a second CAN packet to the CAN bus ECU using the second CAN identifier, wherein the third CAN packet is a historical CAN packet of the gateway ECU;

generate a first random number information authentication code based on the first random number sending key and the random number to be sent by the gateway ECU;

perform a second encryption operation on the first random number sending key and the third CAN packet to obtain a second encryption operation result;

perform an equal-length encryption operation on the second encryption operation result, the first random number information authentication code, and the to-be-sent random number to obtain the random number on which encrypted authentication is performed; and send the random number on which encrypted authentication is performed to the CAN bus ECU.

3. The CAN bus based security communications system according to claim 2, wherein the CAN bus ECU is further configured to:

obtain the second CAN identifier, the third CAN packet, and the random number on which encrypted authentication is performed;

obtain a second random number sending key based on the key of the second CAN identifier and the third CAN packet;

perform a third encryption operation on the second random number sending key and the third CAN packet to obtain a third encryption operation result;

perform an equal-length decryption operation on the third encryption operation result and the random number on which encrypted authentication is performed to obtain a first random number decryption information authentication code;

generate a third random number information authentication code based on the second random number sent by the gateway ECU and the second random number sending key; and determine that the random number sent by the gateway ECU is valid when the first random number decryption information authentication code and the second random number information authentication code are consistent.

4. The CAN bus based security communications system according to claim 1, further comprising a second CAN bus coupled to the gateway ECU, wherein the second CAN bus is coupled to a second CAN bus ECU, and wherein the second CAN bus ECU is configured to:

obtain the first CAN packet on which encrypted authentication is performed;

decrypt the first CAN packet on which encrypted authentication is performed to obtain a first decryption information authentication code, decryption data of the first CAN packet, and a first decryption count value of the first CAN identifier;

obtain the random number;

generate a second information authentication code based on the key of the first CAN identifier, the random number, the first decryption count value of the first CAN identifier, and the decryption data of the first CAN packet; and determine that the first CAN packet on which encrypted authentication is performed is valid when the first decryption information authentication code and the second information authentication code are consistent and the first decryption count value of the first CAN identifier is valid.

5. The CAN bus based security communications system according to claim 4, wherein the CAN bus ECU is further configured to:

obtain a first generation key based on the random number and the key of the first CAN identifier; and generate the first information authentication code based on the count value of the first CAN identifier, the data of the first CAN packet, the first generation key, and the random number; and wherein the second CAN bus ECU is further configured to:

obtain the first generation key based on the random number and the key of the first CAN identifier; and generate the second information authentication code based on the first generation key, the random number, the first decryption count value of the first CAN identifier, and the decryption data of the first CAN packet.

6. The CAN bus based security communications system according to claim 1, wherein when the first CAN packet is a first CAN packet sent by the CAN bus ECU using the first CAN identifier, the historical CAN packet of the CAN bus ECU is an initial default CAN packet allocated in advance by the CAN bus based security communications system to the first CAN identifier, or when the first CAN packet is a non-first CAN packet sent by the CAN bus ECU using the first CAN identifier, the historical CAN packet of the CAN bus ECU is a specified CAN packet from a plurality of CAN packets sent by the CAN bus ECU using the first CAN identifier.

7. The CAN bus based security communications system according to claim 2, wherein when the random number to be sent by the gateway ECU is the second random number, the historical CAN packet of the gateway ECU is an initial default CAN packet allocated in advance by the CAN bus based security communications system to the gateway ECU; or if the random number to be sent by the gateway ECU is a non-first random number sent by the gateway ECU, the historical CAN packet of the gateway ECU is a specified CAN packet from a plurality of CAN packets sent by the gateway ECU using the second CAN identifier.

8. A controller area network CAN bus based security communications apparatus applied to a CAN bus electronic controller ECU, comprising:

a receiver configured to receive a random number from a gateway ECU;

a processor coupled to the receiver and configured to:

allocate a key to a first CAN identifier;

determine a count value of the first CAN identifier according to a quantity of CAN packets transmitted by the CAN bus by using the first CAN identifier;

generate a first information authentication code based on the key of the first CAN identifier, the count value of the first CAN identifier, data of a first CAN packet, and the random number, wherein the first CAN packet is a packet to be sent by the first CAN bus ECU;

transmit the first CAN packet using the first CAN identifier;

perform an encryption operation based on a second CAN packet and the key of the first CAN identifier to obtain a first encryption operation result;

perform an equal-length encryption operation on the first encryption operation result, the first information authentication code, the count value of the first CAN identifier, and the data of the first CAN packet to obtain the first CAN packet on which encrypted authentication is performed, wherein the second CAN packet is a historical CAN packet of the CAN bus ECU; and transmit the first CAN packet on which encrypted authentication is performed.

9. The CAN bus based security communications apparatus according to claim 8, wherein the receiver is further configured to obtain a second CAN identifier, a third CAN packet, and the random number on which encrypted authentication is performed, wherein the processor is further configured to:
  obtain a second random number sending key based on a key of the second CAN identifier and the third CAN packet;
  perform a second encryption operation on the second random number sending key and the third CAN packet to obtain a third encryption operation result;
  perform an equal-length decryption operation on the third encryption operation result and the random number on which encrypted authentication is performed to obtain a first random number decryption information authentication code;
  generate a second random number information authentication code based on the random number on which encrypted authentication is performed and the second random number sending key; and
  determine that the random number on which encrypted authentication is performed is valid when the first random number decryption information authentication code and the second random number information authentication code are consistent.

10. The CAN bus based security communications apparatus according to claim 8, wherein to generate the first information authentication code based on the key of the first CAN identifier, the count value of the first CAN identifier, the data of the first CAN packet, and the random number, the processor is further configured to:
  obtain a first generation key based on the random number and the key of the first CAN identifier; and
  generate the first information authentication code based on the count value of the first CAN identifier, the data of the first CAN packet, the first generation key, and the random number.

11. The CAN bus based security communications apparatus according to claim 8, wherein when the first CAN packet is a first CAN packet sent by the first CAN bus ECU using the first CAN identifier, the historical CAN packet of the CAN bus ECU is an initial default CAN packet allocated in advance to the first CAN identifier, or when the first CAN packet is a non-first CAN packet sent by the CAN bus ECU using the first CAN identifier, the historical CAN packet of the CAN bus ECU is a specified CAN packet from a plurality of CAN packets by the CAN bus ECU using the first CAN identifier.

12. A controller area network (CAN) bus based security communications apparatus applied to a CAN bus electronic control unit (ECU), comprising:
  a receiver configured to receive a first CAN packet on which encrypted authentication is performed and a random number from a gateway ECU; and
  a processor coupled to the receiver and configured to:
    decrypt the first CAN packet on which encrypted authentication is performed to obtain a first decryption information authentication code, decryption data of the first CAN packet, and a decryption count value of a first CAN identifier;
    generate a second information authentication code based on a key of the first CAN identifier, the random number, the decryption count value of the first CAN identifier and the decryption data of the first CAN packet;
    determine whether the first decryption information authentication code and the second information authentication code are consistent; and
    determine that the first CAN packet on which encrypted authentication is performed is valid, when the first decryption information authentication code and the second information authentication code are consistent and the decryption count value of the first CAN identifier is valid.

13. The CAN bus based security communications apparatus according to claim 12, wherein to generate the second information authentication code based on the key of the first CAN identifier, the random number, the decryption count value of the first CAN identifier, and the decryption data of the first CAN packet, the processor is further configured to:
  obtain a first generation key based on the random number and the key of the first CAN identifier; and
  generate the second information authentication code based on the first generation key, the random number, the decryption count value of the first CAN identifier, and the decryption data of the first CAN packet.

14. A method implemented by a controller area network (CAN) bus based security communication system, comprising:
  obtaining, by a CAN bus electronic control unit ECU of the CAN bus based security communication system, a random number from a gateway ECU;
  allocating, by a CAN bus ECU, a key to a first CAN identifier;
  determining, by the CAN bus ECU, a count value of the first CAN identifier according to a quantity of CAN packets transmitted by the CAN bus by using the first CAN identifier;
  generating, by the CAN bus ECU, a first information authentication code based on the key of the first CAN identifier, the count value of the first CAN identifier, data of a first CAN packet, and the random number, wherein the first CAN packet is a packet to be sent by the CAN bus ECU;
  transmitting, by a CAN bus ECU, the first CAN packet using the first CAN identifier;
  performing, by the CAN bus ECU, an encryption operation based on a second CAN packet and the key of the first CAN identifier to obtain a first encryption operation result;
  performing an equal-length encryption operation on the first encryption operation result, the first information authentication code, the count value of the first CAN identifier, and the data of the first CAN packet to obtain the first CAN packet on which encrypted authentication is performed; and
  transmitting the first CAN packet on which encrypted authentication is performed, wherein the second CAN packet is a historical CAN packet of the CAN bus ECU.

15. The method according to claim 14, wherein after obtaining, by the CAN bus ECU, the random number, the method further comprises:
  obtaining, by the CAN bus ECU, a second CAN identifier, a third CAN packet, and the random number on which encrypted authentication is performed;
  obtaining, by the CAN bus ECU, a second random number sending key based on a key of the second CAN identifier and the third CAN packet;
  performing, by the CAN bus ECU, a second encryption operation on the second random number sending key and the third CAN packet to obtain a third encryption operation result;

performing, by the CAN bus ECU, an equal-length decryption operation on the third encryption operation result and the random number on which encrypted authentication is performed to obtain a first random number decryption information authentication code;

generating, by the CAN bus ECU, a second random number information authentication code based on the random number on which encrypted authentication is performed and the second random number sending key; and determining that the second random number on which encrypted authentication is performed is valid when the first random number decryption information authentication code and the second random number information authentication code are consistent.

16. The method according to claim 14, wherein generating, by the CAN bus ECU, a first information authentication code based on a key of a first CAN identifier, a count value of the first CAN identifier, data of a first CAN packet, and the random number comprises:

obtaining, by the CAN bus ECU, a first generation key based on the random number and the key of the first CAN identifier; and generating the first information authentication code based on the count value of the first CAN identifier, the data of the first CAN packet, the first generation key, and the random number.

17. The method according to claim 14, wherein when the first CAN packet is a first CAN packet sent by the CAN bus ECU using the first CAN identifier, the historical CAN packet of the CAN bus ECU is an initial default CAN packet allocated in advance to the first CAN identifier, or when the first CAN packet is a non-first CAN packet sent by the first CAN bus ECU using the first CAN identifier, the historical CAN packet of the CAN bus ECU is a specified CAN packet from a plurality of CAN packets sent by the CAN bus ECU using the first CAN identifier.

18. A method implemented by a controller area network (CAN) bus based security communication system, comprising:

obtaining, by a CAN bus electronic control unit ECU of the CAN bus based security communication system, a first CAN packet on which encrypted authentication is performed;

decrypting, by the CAN bus ECU, the first CAN packet on which encrypted authentication is performed to obtain a first decryption information authentication code, decryption data of the first CAN packet, and a decryption count value of a first CAN identifier;

obtaining, by the CAN bus ECU, a random number from a gateway ECU of the CAN bus based security communication system;

generating a second information authentication code based on a key of the first CAN identifier, the random number, the first decryption count value of the first CAN identifier, and the decryption data of the first CAN packet; and determining that the first CAN packet on which encrypted authentication is performed is when the decryption information authentication code and the second information authentication code are consistent, and the decryption count value of the first CAN identifier is valid.

19. The method according to claim 18, wherein generating, by the CAN bus ECU, a second information authentication code based on a key of the first CAN identifier, the random number, the decryption count value of the first CAN identifier, and the decryption data of the first CAN packet comprises obtaining, by the CAN bus ECU, a first generation key based on the random number sent and the key of the first CAN identifier.

20. The method according to claim 19, generating, by the CAN bus ECU, the information authentication code based on a key of the first CAN identifier, the random number, the decryption count value of the first CAN identifier, and the decryption data of the first CAN packet further comprises generating the information authentication code based on the first generation key, the random number, the decryption count value of the first CAN identifier, and the decryption data of the first CAN packet.

* * * * *

UNITED STATES PATENT AND TRADEMARK OFFICE
CERTIFICATE OF CORRECTION

PATENT NO. : 11,271,771 B2
APPLICATION NO. : 16/692654
DATED : March 8, 2022
INVENTOR(S) : Hsiao-Ying Lin et al.

Page 1 of 1

It is certified that error appears in the above-identified patent and that said Letters Patent is hereby corrected as shown below:

In the Claims

Claim 8, Column 26, Line 39: "controller ECU, comprising:" should read "controller (ECU), comprising:"

Claim 12, Column 27, Line 66: "CAN identifier" should read "CAN identifier,"

Claim 12, Column 28, Line 5: "is valid, when the" should read "is valid when the"

Claim 14, Column 30, Line 18: "is when" should read "is valid when"

Signed and Sealed this
Seventeenth Day of May, 2022

Katherine Kelly Vidal
*Director of the United States Patent and Trademark Office*